US012600608B2

(12) United States Patent
Weiss et al.

(10) Patent No.: US 12,600,608 B2
(45) Date of Patent: Apr. 14, 2026

(54) ASSISTANCE SYSTEMS AND METHODS FOR A MATERIAL HANDLING VEHICLE

(71) Applicant: The Raymond Corporation, Greene, NY (US)

(72) Inventors: Joseph A. Weiss, Greene, NY (US); Gregory W. Smiley, Greene, NY (US); Joshua T. Smith, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 561 days.

(21) Appl. No.: 17/685,715

(22) Filed: Mar. 3, 2022

(65) Prior Publication Data

US 2022/0281728 A1 Sep. 8, 2022

Related U.S. Application Data

(60) Provisional application No. 63/156,505, filed on Mar. 4, 2021.

(51) Int. Cl.
B66F 9/075 (2006.01)
G05D 1/00 (2024.01)
G06F 3/01 (2006.01)

(52) U.S. Cl.
CPC ........ B66F 9/07581 (2013.01); B66F 9/0755 (2013.01); G05D 1/0038 (2013.01);
(Continued)

(58) Field of Classification Search
CPC ...... B66F 9/07581; B66F 9/0755; B66F 9/24; G05D 1/0038; G05D 1/0044;
(Continued)

(56) References Cited

U.S. PATENT DOCUMENTS 4,122,957 A 10/1978 Allen et al.
4,678,329 A 7/1987 Lukowski, Jr. et al.
(Continued)

FOREIGN PATENT DOCUMENTS

AU 2016266099 A1 12/2016
CA 2786407 A1 7/2011
(Continued)

OTHER PUBLICATIONS

WO-2020049897-A1 Translation (Year: 2020).*
(Continued)

*Primary Examiner* — Christopher George Fees
(74) *Attorney, Agent, or Firm* — Quarles & Brady LLP

(57) ABSTRACT

Systems and methods provide assistance to an operator of a material handling vehicle. A training reinforcement assistance device has a frame supporting an optical system, the optical system being configured to display virtual content on a display, and to enable viewing of at least a portion of a surrounding environment; an imager operably coupled with the frame; an accelerometer operably coupled with the frame and configured to detect an orientation of the frame; an eye-tracking unit operably coupled with the frame and configured to detect a viewing direction of an operator; and a controller operably coupled with the imager and the display. The controller receives environmental information from at least one of the imager, the accelerometer, or the eye-tracking unit and to overlay the image of the environment to assist the operator in maneuvering a material handling vehicle based on vehicle kinematics of the material handling vehicle.

18 Claims, 18 Drawing Sheets

(52) U.S. Cl.
CPC ......... *G05D 1/0044* (2013.01); *G05D 1/0234* (2013.01); *G06F 3/013* (2013.01)

(58) Field of Classification Search
CPC .......... G05D 1/0234; G05D 2201/0216; G06F 3/013; G09B 9/00; G09B 9/042
See application file for complete search history.

(56) References Cited

U.S. PATENT DOCUMENTS

| | | | |
|---|---|---|---|
| 7,010,404 | B2 | 3/2006 | Ichijo et al. |
| 7,027,621 | B1 | 4/2006 | Prokoski |
| 7,219,769 | B2 | 5/2007 | Yamanouchi et al. |
| 7,320,385 | B2 | 1/2008 | Katae et al. |
| 8,395,529 | B2 | 3/2013 | Seder et al. |
| 8,561,897 | B2 | 10/2013 | Kunzig et al. |
| 8,963,704 | B2 | 2/2015 | Adami |
| 8,965,561 | B2 | 2/2015 | Jacobus et al. |
| 9,001,153 | B2 | 4/2015 | Green et al. |
| 9,317,037 | B2 | 4/2016 | Byford et al. |
| 9,679,447 | B2 | 6/2017 | Carlson et al. |
| 9,802,528 | B2 | 10/2017 | Adami |
| 9,828,223 | B2 | 11/2017 | Svensson et al. |
| 9,994,228 | B2 | 6/2018 | Krueger |
| 10,138,101 | B2 | 11/2018 | Svensson et al. |
| 10,222,215 | B2 | 3/2019 | Holz |
| 10,317,900 | B2 | 6/2019 | Kamhi et al. |
| 10,346,797 | B2 | 7/2019 | Jacobus et al. |
| 10,583,840 | B2 | 3/2020 | Prakah-Asante et al. |
| 10,761,541 | B2 | 9/2020 | Holz |
| 10,800,607 | B2 | 10/2020 | Otto et al. |
| 10,875,754 | B2 | 12/2020 | Pautz et al. |
| 10,964,190 | B2 | 3/2021 | Peyrard |
| 11,128,636 | B1 | 9/2021 | Jorasch et al. |
| 11,402,830 | B2 | 8/2022 | Sullivan et al. |
| 11,820,634 | B2 | 11/2023 | Theos et al. |
| 11,851,310 | B2 | 12/2023 | Yeo et al. |
| 11,945,649 | B2 | 4/2024 | Galluzzo et al. |
| 12,038,754 | B2 | 7/2024 | Iio et al. |
| 2011/0010023 | A1 | 1/2011 | Kunzig et al. |
| 2012/0194418 | A1 | 8/2012 | Osterhout et al. |
| 2012/0194553 | A1 | 8/2012 | Osterhout et al. |
| 2014/0063055 | A1 | 3/2014 | Osterhout et al. |
| 2014/0114530 | A1* | 4/2014 | Fitch .......................... B66F 9/24 701/36 |
| 2015/0294505 | A1* | 10/2015 | Atsmon .............. G06F 3/04815 345/633 |
| 2017/0146801 | A1 | 5/2017 | Stempora |
| 2017/0287357 | A1* | 10/2017 | Weiss ........................ B66F 9/20 |
| 2019/0121353 | A1* | 4/2019 | Datema .................... B28C 5/422 |
| 2019/0385342 | A1* | 12/2019 | Freeman ................. G06T 11/00 |
| 2020/0012274 | A1* | 1/2020 | Kamiya ..................... B66F 9/24 |
| 2020/0174479 | A1 | 6/2020 | Howey |
| 2020/0254619 | A1* | 8/2020 | Grundfest .............. G05D 1/104 |
| 2021/0043085 | A1* | 2/2021 | Kreiling .................... E02F 3/96 |
| 2021/0081166 | A1* | 3/2021 | Acciarri ................ G06F 3/0346 |
| 2021/0331587 | A1* | 10/2021 | Kim ......................... G06F 3/013 |
| 2022/0267131 | A1* | 8/2022 | Magzimof ............ B66F 17/003 |
| 2022/0292718 | A1* | 9/2022 | Dos Santos Mendonca ............... G02B 27/0172 |
| 2022/0366596 | A1* | 11/2022 | Katsura ..................... G06T 7/70 |
| 2022/0404949 | A1* | 12/2022 | Berquam ................ G06F 3/011 |
| 2023/0303373 | A1 | 9/2023 | Chiu et al. |
| 2024/0427335 | A1* | 12/2024 | Simpson .............. G05D 1/0038 |

FOREIGN PATENT DOCUMENTS

| | | |
|---|---|---|
| DE | 102007063226 A1 | 7/2009 |
| EP | 0822474 A1 | 2/1998 |
| EP | 3229219 A1 | 10/2017 |
| EP | 4253306 A1 | 10/2023 |
| WO | 2007092512 A2 | 8/2007 |
| WO | 2017155488 A1 | 9/2017 |
| WO | 2017174205 A2 | 10/2017 |
| WO | WO-2020049897 A1 * | 3/2020 |
| WO | 2020229593 A1 | 11/2020 |
| WO | 2023019038 A1 | 2/2023 |

OTHER PUBLICATIONS

European Patent Office, Extended Search Report, Application No. 22160158.6, Jul. 27, 2022, 7 pages.
European Patent Office, Extended European Search Report, Application No. 24187323.1, Feb. 25, 2025, 9 pages.

* cited by examiner

ASSISTANCE SYSTEMS AND METHODS FOR A MATERIAL HANDLING VEHICLE

CROSS-REFERENCES TO RELATED APPLICATIONS

This application is based on, claims priority to, and incorporates herein by reference in its entirety, U.S. Provisional Patent Application No. 63/156,505, filed on Mar. 4, 2021, and entitled "Assistance Systems and Methods for a Material Handling Vehicle."

STATEMENT REGARDING FEDERALLY SPONSORED RESEARCH

Not Applicable.

BACKGROUND

Material handling vehicles have been developed to transport goods loaded onto generally standardized transport platforms. For example, forklifts are often used to lift goods loaded onto a pallet. Pallets often have vertical supports connected to a top and thus define a channel. Certain known forklifts are configured to approach pallets and insert a two-tined fork into the channel between the vertical support and below the top. The pallet and loaded goods may then be lifted with the forks. The combined pallet and loaded goods may be referred to as a load.

For certain types of vehicles there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The present disclosure relates generally to augmented vehicle feedback and, more specifically, to augmented reality systems and methods for use in conjunction with a material handling vehicle operated in a warehouse environment.

In one aspect, the present disclosure provides a system comprising a training reinforcement assistance device having a frame supporting an optical system, wherein the optical system is configured to display virtual content on a display, and to enable viewing of at least a portion of a surrounding environment; an imager operably coupled with the frame and configured to produce an image of an environment of the imager; an accelerometer operably coupled with the frame and configured to detect an orientation of the frame; an eye-tracking unit operably coupled with the frame and configured to detect a viewing direction of an operator; and a controller operably coupled with the imager and the display; wherein the controller is configured to receive environmental information from at least one of the imager, the accelerometer, or the eye-tracking unit, and to overlay the image of the environment to assist the operator in maneuvering a material handling vehicle based on vehicle kinematics of the material handling vehicle within a line of sight of the operator though the optical system.

In another aspect, the present disclosure provides a system of providing an overlaid image to an operator of a material handling vehicle through an optical system, the system comprising a training reinforcement assistance device having a frame supporting an imager and a display, the display operably coupled with the optical system; a controller coupled with the frame; a control unit operably coupled with the material handling vehicle and communicatively coupled with the controller; and a first fiducial positioned on the material handling vehicle, the imager configured to detect the fiducial to orient the frame relative to the material handling vehicle; wherein the display is configured to generate an image based on the location of the frame and at least one vehicle kinematic.

In another aspect, the present disclosure provides a system comprising a training reinforcement assistance device having a frame supporting an optical system, wherein the optical system is configured to display virtual content and enable viewing of at least a portion of a surrounding environment; an eye-tracking unit operably coupled with the frame and configured to detect a viewing direction of an operator; and a controller operably coupled with the imager and the display; wherein the controller is configured to calculate a position of the image provided by the optical system based on a gaze axis of the operator, the image configured to provide assistance in operating a material handling vehicle.

In another aspect, the present disclosure provides a system to provide a calculated path for an operator of a material handling vehicle through an optical system, the system comprising a training reinforcement assistance device having a frame supporting an imager and a display, the display operably coupled with the optical system; a controller coupled with the frame; a control unit operably coupled with the material handling vehicle and with the controller; an imager operably coupled with the frame and configured to produce an image of an environment of the imager; and an accelerometer operably coupled with the frame and configured to detect an orientation of the frame; wherein the controller is configured to receive environmental information from at least one of the imager and the accelerometer, and to identify a position of a load and to plan a path and to execute steering commands for the material handling vehicle while the operator is to control throttle commands.

In another aspect, the present disclosure provides a system comprising a training reinforcement assistance device having a frame supporting an optical system, wherein the optical system is configured to display virtual content on a display, and to enable viewing of at least a portion of a surrounding environment; an imager operably coupled with the frame and configured to produce an image of an environment of the imager; an accelerometer operably coupled with the frame and configured to detect an orientation of the frame; an eye-tracking unit operably coupled with the frame and configured to detect a viewing direction of an operator; and a controller operably coupled with the imager and the display; wherein the controller is configured to receive environmental information from at least one of the imager, the accelerometer, or the eye-tracking unit, and to overlay the image of the environment to assist the operator in maneuvering a material handling vehicle based on vehicle kinematics of the material handling vehicle within a line of sight of the operator though the optical system. The material handling vehicle includes at least one fork and the image is positioned on the at least one fork as perceived through the optical system.

In another aspect, the present disclosure provides a system comprising a material handling vehicle, a training reinforcement assistance device having a frame supporting an optical system. The optical system is configured to display virtual content and enable viewing of at least a portion of a surrounding environment. The system further includes an imager operably coupled with the frame and configured to produce an overlaid image on at least the portion of the surrounding environment, and a controller operably coupled with the imager and the optical system. The controller is configured to calculate a position of the overlaid image based on a location of the frame within the material handling vehicle. The overlaid image includes a pivot point defined by the material handling vehicle.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
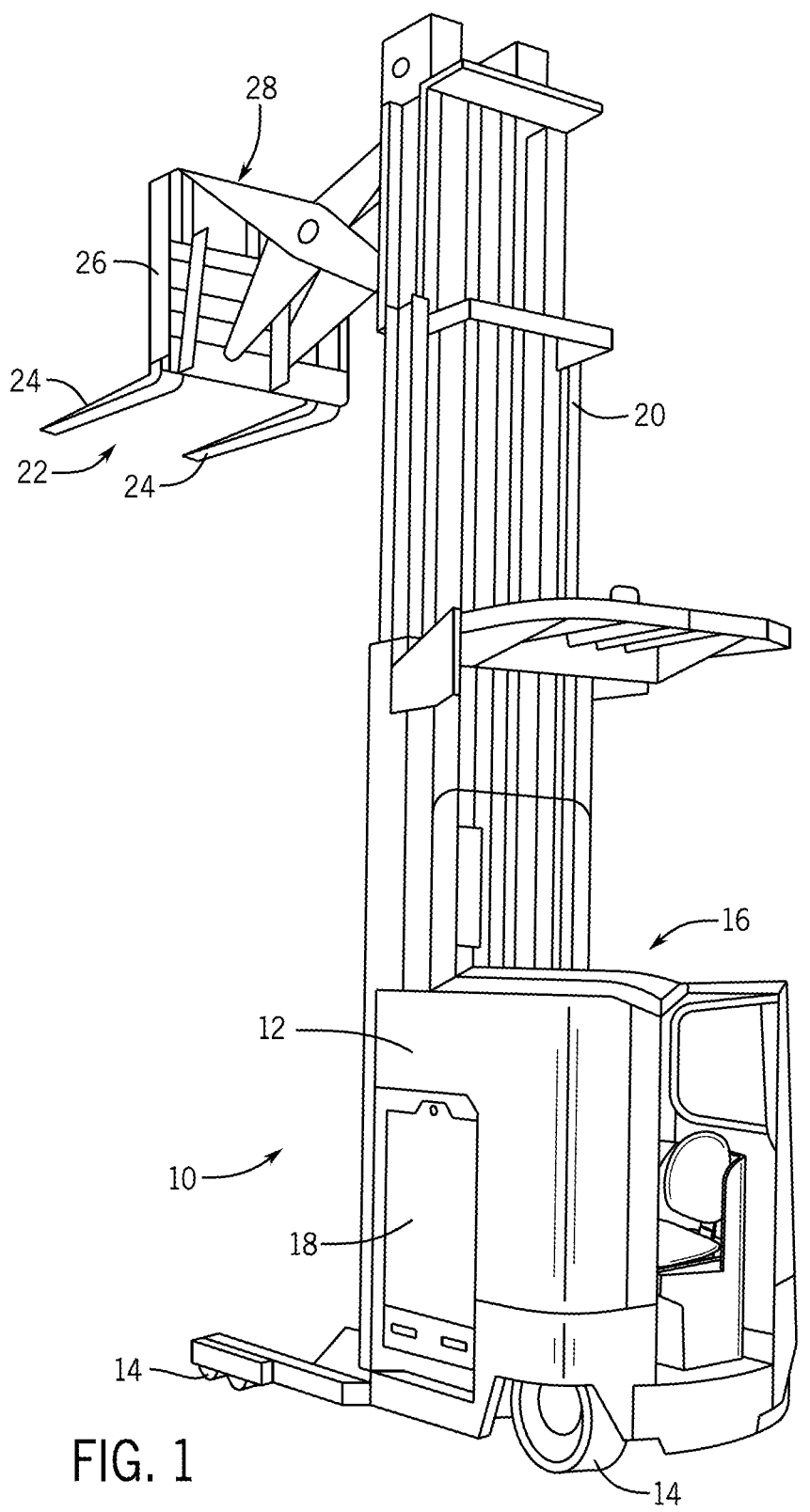
FIG. 1 is a side perspective view of a material handling vehicle (MHV) according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles (MHVs) are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles.

FIG. 1 illustrates a MHV 10 (shown here as a reach truck) that includes a body 12 having a plurality of wheels 14 and defining an operator compartment 16 including one or more controls and/or displays. The body 12 may accommodate a battery 18 or other power source and may house one or more motors. The MHV 10 includes a mast 20 coupled to the body 12 for raising and lowering a fork assembly 22 (or, in other embodiments, a platform, an operator cabin, or other assemblies). That is, the mast 20 can be in the form of a telescoping mast with the fork assembly 22 attached thereto such that the fork assembly 22 can be selectively raised and lowered by the mast 20. The fork assembly 22 may include one or more forks 24 for engaging a pallet or other load and a support assembly 26. The illustrated fork assembly 22 can include a pair of forks 24. In various examples, the fork assembly 22 can be coupled to the mast 20 by a reach actuator 28.

Figure 2:
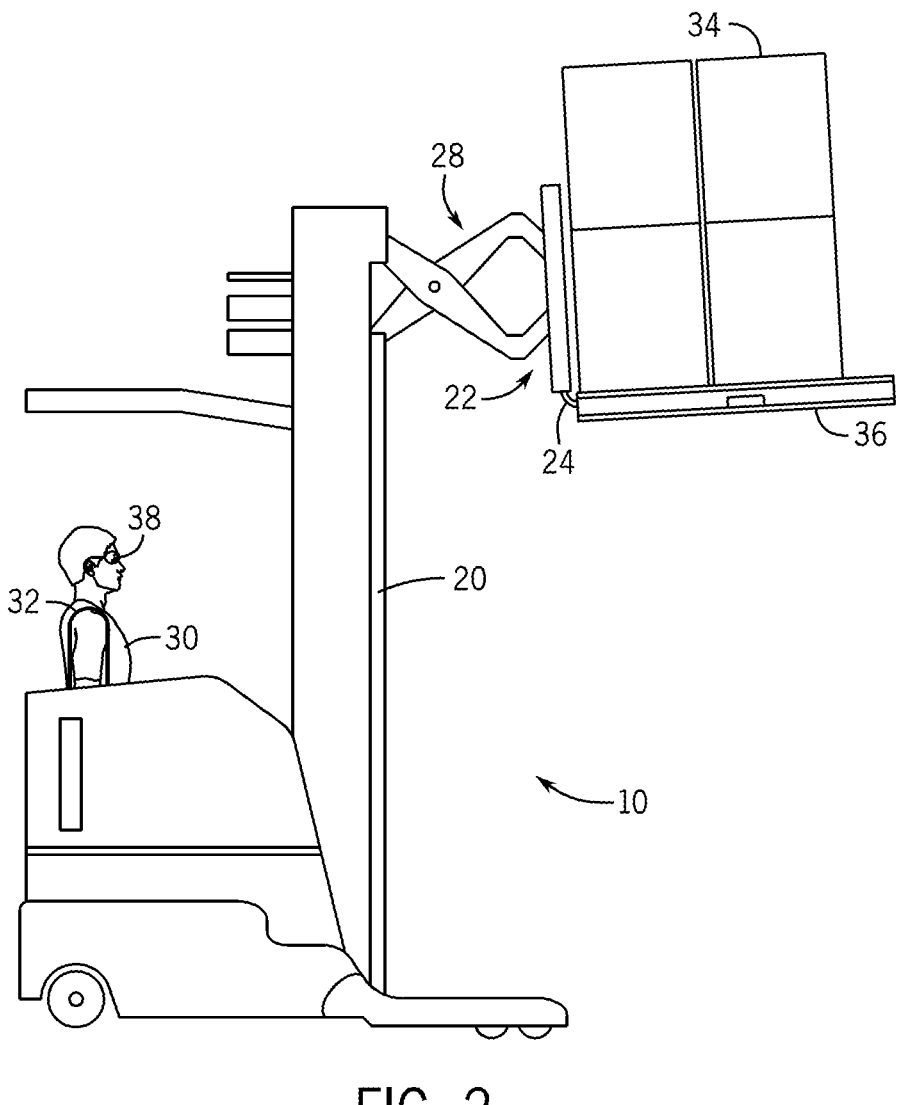
FIG. 2 is a plan view of the MHV and a training reinforcement assistance device, according to aspects of the present disclosure.

As illustrated in FIG. 2, the MHV 10 can be operated by an operator 30, who may be retained by a safety harness 32, and can be capable of picking, placing, transporting, or otherwise manipulating a load 34, possibly including a pallet 36. In various examples, the operator 30 controls the MHV 10 so that the forks 24 of the fork assembly 22 engage the pallet 36 carrying a load 34. In so doing, the operator 30 may extend or retract the reach actuator 28 to pick, place, engage, or otherwise manipulate the load 34. That is, the reach actuator 28 can be configured to extend the fork assembly 22 away from the mast 20 and retract the fork assembly 22 towards the mast 20. Further, the fork assembly 22 and thereby the load 34 may be raised or lowered by the mast 20. Once the load 34 is situated on the fork assembly 22, the operator 30 can move the load 34 to another location as needed. In certain embodiments, a human operator 30 may be replaced with an automated controller to comprise a fully-automated system (i.e., an autonomously guided material handling vehicle).

In general, a training reinforcement assistance device is in communication with a material handling vehicle to form a driver training reinforcement assistance system. In some examples, the MHV 10 communicates with a training reinforcement assistance device 38 to form a driver training reinforcement assistance system 41 (see, e.g., FIGS. 2-4) for the operator 30 of the MHV 10. For instance, in various examples, the training reinforcement assistance device 38 may be configured as a head mounted device, heads-up device, a wearable device that can be under or on top of clothing, and/or integrated into eyeglasses. In examples in which the training reinforcement assistance device 38 is configured as a wearable device, the wearable device may include an image display 74 close enough to an eye of an operator 30 such that a displayed image fills or nearly fills a field of view associated with the eye, and appears as a normal sized image, such as might be displayed on a traditional display. The relevant technology may be referred to as "near-eye displays." The training reinforcement assistance device 38 may be configured as, for example, eyeglasses, goggles, a helmet, a hat, a visor, a headband, or in some other form that can be supported on or from a head of the operator 30. The training reinforcement assistance device 38 may be further configured to display images to both eyes of the operator 30. Alternatively, the training reinforcement assistance device 38 may display images to only one eye, either a left eye or a right eye.

Figure 3:
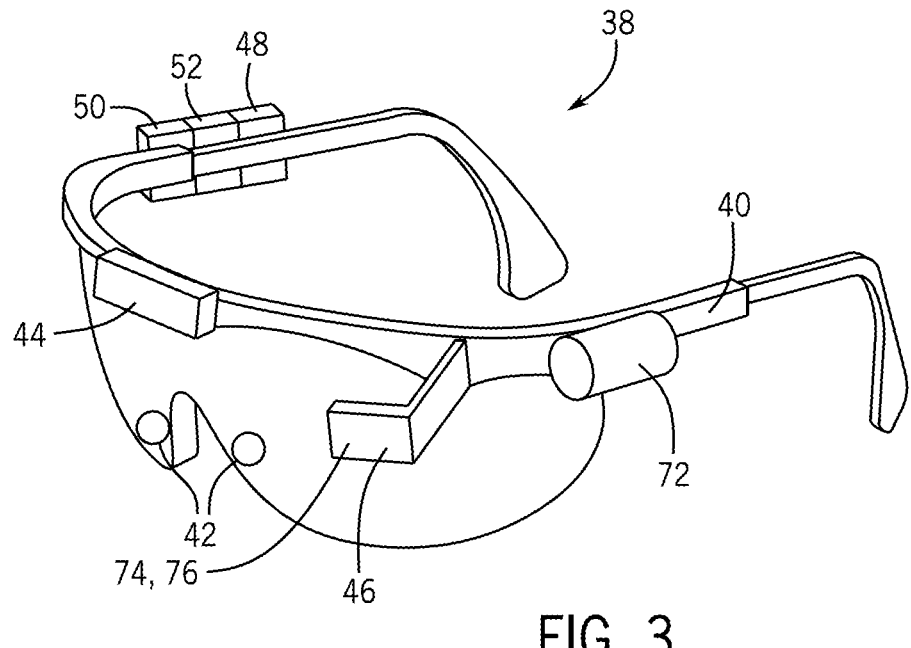
FIG. 3 is a side perspective view of the training reinforcement assistance device of FIG. 2.
Figure 4:
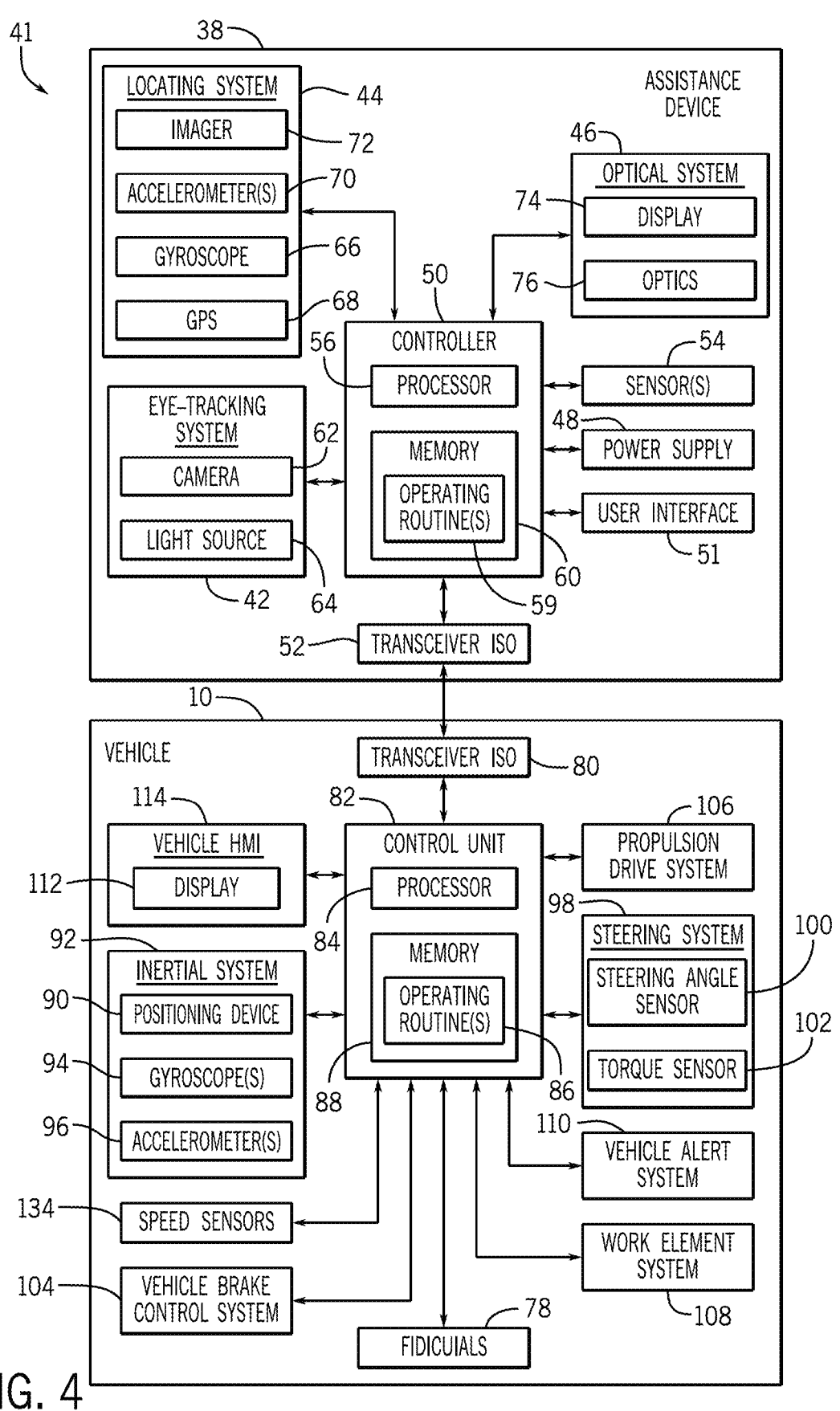
FIG. 4 is a block diagram of the training reinforcement assistance device and the MHV of FIG. 2.

In some examples, such as illustrated in FIGS. 3 and 4, the training reinforcement assistance device 38 may include several different components and subsystems that may be supported by a frame 40. For instance, the components coupled to or included in the training reinforcement assistance device 38 may include an eye-tracking system 42, a locating system 44, an optical system 46, a power supply 48, a controller 50, an operator interface 51, a wireless transceiver 52, and/or one or more peripherals, such as various additional sensors 54, a speaker, or a microphone. Components of the training reinforcement assistance device 38 may be configured to work in an interconnected fashion with each other and/or with other components coupled to respective systems. For example, the power supply 48 may provide power to all the components of the training reinforcement assistance device 38 and may include, for example, a rechargeable lithium-ion battery. Additionally and/or alternatively, the power supply 48 may be disposed remotely from the training reinforcement assistance device 38. For example, the training reinforcement assistance device 38 may be powered by the vehicle's battery rather than supplying its own power supply.

The controller 50 may receive information from and control the eye-tracking system 42, the locating system 44, the optical system 46, and any of the peripherals. The controller 50 includes a processor 56 that may be configured to execute operating routine(s) 59 stored in a memory 60. The controller 50 includes any combination of software and/or processing circuitry suitable for controlling various components of the training reinforcement assistance device 38 described herein including without limitation processors, microcontrollers, application-specific integrated circuits, programmable gate arrays, and any other digital and/or analog components, as well as combinations of the foregoing, along with inputs and outputs for processing control signals, drive signals, power signals, sensor signals, and so forth. All such computing devices and environments are intended to fall within the meaning of the term "controller" or "processor" as used herein unless a different meaning is explicitly provided or otherwise clear from the context.

The eye-tracking system 42 may include hardware such as a camera 62 and at least one light source 64. The camera 62 may be utilized by the eye-tracking system 42 to capture images of an eye of the operator 30. The images may include either video images or still images. The images obtained by the camera 62 regarding the eye of the operator 30 may help determine where the operator 30 may be looking within a field of view of the training reinforcement assistance device 38, for instance, by ascertaining a location of the eye pupil of the operator 30. The camera 62 may include a visible light camera with sensing capabilities in the infrared wavelengths.

The light source 64 may include one or more infrared light-emitting diodes or infrared laser diodes that may illuminate a viewing location, i.e., an eye of the operator 30. Thus, one or both eyes of an operator 30 of the training reinforcement assistance device 38 may be illuminated by the light source 64. The light source 64 may illuminate the viewing location continuously or may be turned on at discrete periods.

In addition to instructions that may be executed by the processor 56, the memory 60 may store data that may include a set of calibrated operator eye pupil positions and a collection of past eye pupil positions. Thus, the memory 60 may function as a database of information related to gaze direction. Calibrated operator eye pupil positions may include, for instance, information regarding extents or range of an eye pupil movement (right/left and upwards/downwards), and relative position of eyes of the operator 30 with respect to the training reinforcement assistance device 38. For example, a relative position of a center and corners of a training reinforcement assistance device screen with respect to a gaze direction or a gaze angle of the eye pupil of the operator 30 may be stored. Also, locations or coordinates of starting and ending points, or waypoints, of a path of a moving object displayed on the training reinforcement assistance device 38, or of a static path (e.g., semicircle, Z-shape etc.) may be stored on the memory 60.

The locating system 44 may include a gyroscope 66, a global positioning system (GPS) 68, an accelerometer 70, an imager 72, and/or any other practicable device for determining a location. The locating system 44 may be configured to provide information associated with a position and an orientation of the training reinforcement assistance device 38 to the processor 56. The gyroscope 66 may include a microelectromechanical system (MEMS) gyroscope or a fiber optic gyroscope as examples. The gyroscope 66 may be configured to provide orientation information to the processor 56. The GPS unit 68 may include a receiver that obtains clock and other signals from GPS satellites and may be configured to provide real-time location information to the processor 56. The locating system 44 may further include an accelerometer 70 configured to provide motion input data to the processor 56.

In some examples, the imagers 72 and/or cameras 62 described herein may each include an area-type image sensor, such as a CCD or a CMOS image sensor, and image-capturing optics that captures an image of an imaging field of view defined by the image-capturing optics. In some instances, successive images may be captured to create a video.

In various examples, the images produced by the imager 72 may be used to monitor the environment surrounding the operator 30 and/or track any fiducials 78, which may be defined as a visual marker that is positioned in a predefined location. In some examples, the fiducials 78 are positioned on various portions of the MHV 10. In operation, one or more of the fiducials 78 may be within the imaging field of view. Based on which fiducials 78 are within the imaging field of view, the controller 50 may be capable of determining a location and/or orientation of the training reinforcement assistance device 38 and, consequently, the operator 30 relative to defined locations on the MHV 10. In some examples, in addition to or in lieu of predefined fiducials 78, the images or video produced by the imager 72 can be defined in reference with a visual map of a facility to localize the position of the training reinforcement assistance device 38.

The optical system 46 may include components configured to provide images to a viewing location, i.e., an eye of the operator 30. The components may include a display 74 and optics 76. These components may be optically and/or electrically coupled to one another and may be configured to provide viewable images at a viewing location. One or two optical systems 46 may be provided in the training reinforcement assistance device 38. In other words, the operator 30 may view images in one or both eyes, as provided by one or more optical systems 46. Also, the optical system(s) 46 may include an opaque display and/or a see-through display coupled to the display 74, which may allow a view of the real-world environment while providing superimposed virtual or overlaid images. In some examples, the see-through display is formed on the lenses of the training reinforcement assistance device 38. The camera 62 coupled to the eye-tracking system 42 may be integrated into the optical system 46.

The training reinforcement assistance device 38 may further include the operator interface 51 for providing information to the operator 30 or receiving input from the operator 30. The operator interface 51 may be associated with, for example, displayed images, a touchpad, a keypad, buttons, a microphone, and/or other peripheral input devices. The controller 50 may control functions of the training reinforcement assistance device 38 based on input received through the operator interface 51. For example, the controller 50 may utilize an operator input from the operator interface 51 to control how the training reinforcement assistance device 38 may display images within a field of view or may determine what images the training reinforcement assistance device 38 may display.

With further reference to FIG. 4, in some examples, the training reinforcement assistance device 38 may communicate via wired and/or wireless communication with the MHV 10 through corresponding transceivers 52, 80. The communication may occur through one or more of any desired combination of wired (e.g., cable and fiber) and/or wireless communication protocols and any desired network topology (or topologies when multiple communication mechanisms are utilized). Exemplary wireless communication networks include a Bluetooth® module, a Zigbee® transceiver, a Wi-Fi™_transceiver, an IrDA transceiver, an RFID transceiver, etc., local area networks (LAN), and/or wide area networks (WAN), including the Internet, cellular, satellite, microwave, and radio frequency, providing data communication services.

The MHV transceiver 80 may further communicate with a control unit 82 of the MHV 10. The control unit 82 is configured with a processor 84 and/or analog and/or digital circuitry for processing one or more operating routines 86 stored in a memory 88. Information from the training reinforcement assistance device 38 or other components of the MHV 10 can be supplied to the control unit 82 via a communication network of the MHV 10, which can include a controller area network (CAN), a local interconnect network (LIN), or other protocols. It should be appreciated that the control unit 82 may be a stand-alone dedicated controller or may be a shared controller integrated with the training reinforcement assistance device 38 or another component of the MHV 10 in addition to any other conceivable onboard or off-board vehicle control systems.

With reference to the embodiment of the MHV 10 shown in FIG. 4, additional vehicle-related information may be provided to the control unit 82 by a positioning device 90, such as a global positioning system (GPS) located on the MHV 10 and/or the GPS 68 on the training reinforcement assistance device 38. Additionally, the control unit 82 may communicate with an inertial system 92 including one or more gyroscopes 94, and/or accelerometers 96 to measure the position, orientation, direction, and/or speed of the MHV 10.

In some instances, the control unit 82 of MHV 10 may be further configured to communicate with a variety of vehicle equipment. For example, the control unit 82 of the MHV 10 may be coupled with a steering system 98 of the MHV 10 to operate the steered wheels 14 of the MHV 10. The steering system 98 may include a steering angle sensor 100. In some embodiments, the steering wheel 58 of the MHV 10 may be mechanically coupled with the steered wheels 14 of the MHV 10 such that the steering wheel 58 moves in concert with steered wheels 14 via an internal torque or linkage. In such instances, the steering system 98 may include a torque sensor 102 that senses torque (e.g., gripping and/or turning) on the steering wheel 58 indicative of manual intervention by the operator 30.

The control unit 82 of the MHV 10 may also communicate with a vehicle brake control system 104 of the MHV 10 to receive vehicle speed information such as individual wheel speeds of the MHV 10. Additionally or alternatively, vehicle speed information may be provided to the control unit 82 by a propulsion drive system 106 and/or a vehicle speed sensor 134, among other conceivable techniques. The propulsion drive system 106 may provide a motive force for moving the MHV 10 in a designated travel direction at a controlled speed.

The MHV 10 may further include a work element system 108 that manipulates a work element or function, such as the fork assembly 22 generally illustrated in FIG. 1. In various examples, the work element system 108 can send command signals to control a lift motor that is connected to a hydraulic circuit that forms a lift assembly for raising, lowering, or otherwise manipulating the work element. In some examples, a position sensor provides a signal to the control unit 82 indicating the height of the work element. Similarly, a weight sensor can be provided on the work element. A load presence sensor, such as a radio frequency identification (RFID) tag reader or a bar code reader, for example, can also be mounted on the MHV 10 to identify the goods being transported. In some examples, the work element system 108 may manipulate and/or include the reach actuator 28, a lift motor, and/or a mast tilt actuator.

Through interaction with the steering system 98, the vehicle brake control system 104, the propulsion drive system 106, and/or the work element system 108, various kinematics and positional data of the MHV 10 and/or of the work element can be determined. With the various kinematics and positional data, the operator 30 of the training reinforcement assistance device 38 simultaneously observes a surrounding environment with an overlaid image produced by the optical system 46. The controller 50 of the training reinforcement assistance device 38 and/or the control unit 82 of the MHV 10 may use data from various components described herein to determine a displayed overlaid, or virtual, image to be viewed by the operator 30. The overlaid, or virtual, image may be superimposed in a discrete position to assist the operator 30 in manipulating the MHV 10 and/or a work element of the MHV 10. For example, the virtual image may be crosshairs that are positioned between two arms of the forks 24 (see, e.g., FIG. 11) and/or positioned on the at least one fork 24 as perceived through the optical system 46. In such examples, as the operator 30 moves, the locating system 44 of the training reinforcement assistance device 38 may recalibrate a position of the virtual image to dynamically update the image position based on the updated data. Similarly, the eye-tracking system 42 may track an eye or an eye pupil of the operator 30. As the eye or eye pupil of the operator 30 moves, the eye-tracking system 42 may track a path associated with the eye or the eye pupil movement. The controller 50 can receive the information associated with the path associated with the eye movement from the eye-tracking system 42 and update the location of the virtual image based on the operator's eye direction.

In various examples, placement of eyeglasses including the training reinforcement assistance device 38 on ears and a nose of the operator 30 may be slightly different each time the operator 30 wears the training reinforcement assistance device 38 after removing the training reinforcement assistance device 38. A relative location of the eye with respect to a camera 62 coupled to the eye-tracking system 42 or a relative location of a gaze axis associated with the eye with respect to a reference axis associated with the training reinforcement assistance device 38, for example, may vary. Thus, to calibrate the eye-tracking system 42, the controller 50 may initiate calibration procedures.

In addition, while in use, the imager 72 on the training reinforcement assistance device 38 may be used to identify conditions in a warehouse, such as approaching an intersection, driving near pedestrians, and approaching other vehicles 10. Such conditions may be stored by the system and various data mining techniques, such as machine learning, may analyze the conditions. Sensors, such as the imager 72 and eye-tracking system 42, can confirm that the operator 30 shows specific activities within these conditions, such as making eye contact with pedestrians and looking both ways before entering an intersection. The system 41 may combine data from the MHV 10 and the training reinforcement assistance device 38 to determine the cases when the operator 30 is not looking in the direction of travel. For example, if the MHV 10 communicates that it has driven greater than a certain distance and the eye-tracking system 42 confirms that the operator 30 is not looking in the direction of travel as determined by visual positioning (e.g., by inferring camera 62 movement based on the movement of tracked pixels in the scene, or by referencing information from a vehicle tracking system such as a real time location system ("RTLS")), the system 41 may determine that the operator 30 is not looking in the direction of travel. Alternately, this sort of determination can be made locally on the training reinforcement assistance device 38 alone by comparing vehicle data with visual positioning data provided by the training reinforcement assistance device 38. In some examples, the system 41 may also monitor whether or not the operator 30 has made a complete stop at an intersection and sounded the horn when appropriate by verifying that the vehicle speed goes to zero at the intersection and that the horn button is pressed at least once.

In some instances, use of the training reinforcement assistance device 38 provided herein may encourage the operator 30 to continue to have required operating habits of the MHV 10, which may be reinforced even after the formal training period is complete and throughout the entire warehouse, rather than just locations where warehouse managers can observe use of the MHV 10. In addition, the training reinforcement assistance device 38 can identify certain activities and bring them to the attention of the operator 30 and/or the warehouse manager. Thus, it is conceivable that operators 30 will mitigate certain activities since they know that others are monitoring their actions. To this end, warehouse managers can see a representative sample of operator conduct in the warehouse. In this way, the training reinforcement assistance device 38 can serve as an indicator to identify activities before an event occurs.

According to some examples, the control unit 82 may communicate with a vehicle indication system 110, which may prompt visual, auditory, and tactile indications if certain conditions are determined. For instance, one or more light sources on the MHV 10 and/or training reinforcement assistance device 38 may provide a visual indication and a vehicle horn and/or a speaker may provide an audible indication. Additionally, the MHV 10 and/or the training reinforcement assistance device 38 may provide haptic or tactile feedback to indicate to the operator 30 that certain conditions are determined.

Figure 5:
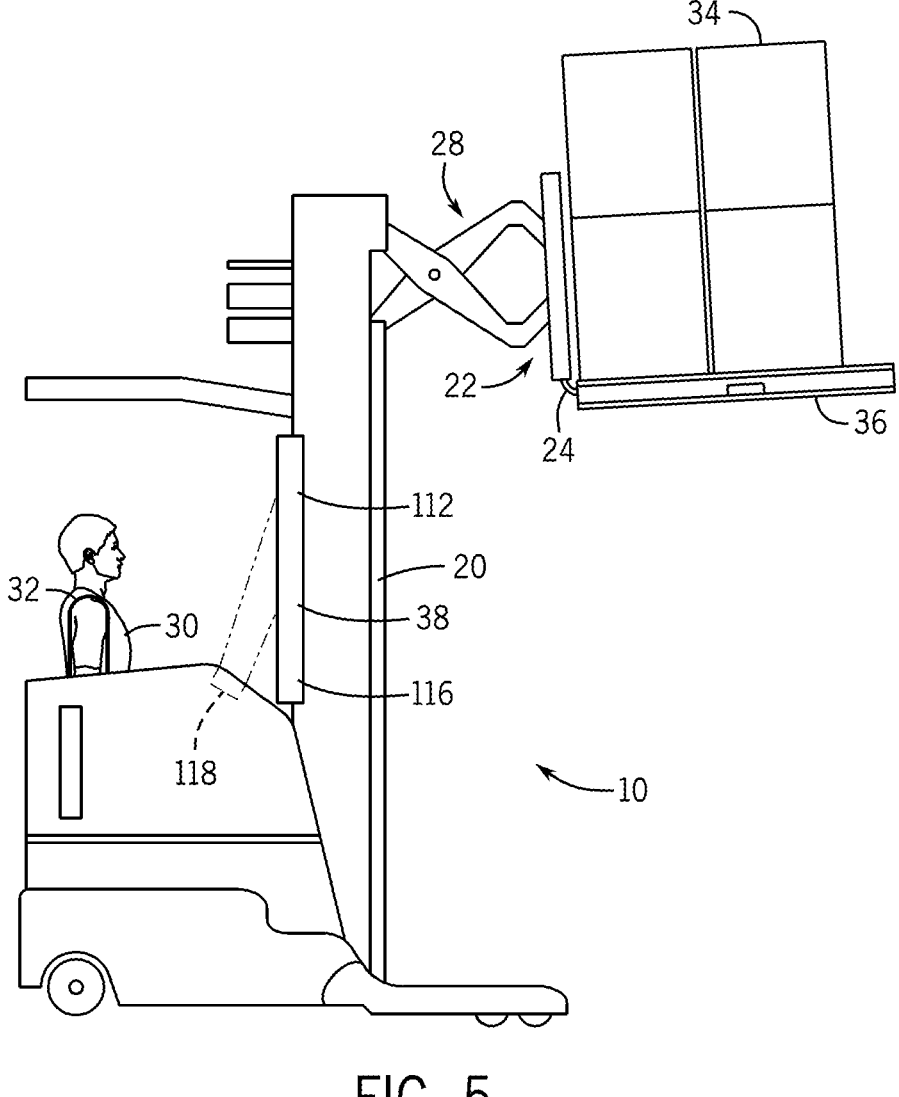
FIG. 5 is a side view of an MHV and a training reinforcement assistance device, according to aspects of the present disclosure.

In some examples, such as those illustrated in FIGS. 4 and 5, in addition to the display 74 on the training reinforcement assistance device 38 and/or in lieu of the display 74 of the training reinforcement assistance device 38, the MHV 10 may include a heads-up display 112 (see FIG. 5). The heads-up display 112 may be configured as a heads-up display, a liquid crystal display (LCD), an organic light emitting diode (OLED) display, a flat panel display, a solid state display, a light emitting diode (LED), an incandescent bulb, or any other type of display. The heads-up display 112 may be positioned between the operator 30 and the work element (e.g., the fork assembly 22, the reach actuator 28, the mast 20, etc.) and provide overlaid images based on the various conditions provided herein.

In some instances, the heads-up display 112 may be part of a vehicle human-machine interface (HMI) 114 or a stand-alone display and may be configured as a heads-up display 112 that can be used to project information into view through a vehicle window 116, such that the overlaid image can appear to be located in front of the vehicle window 116. Accordingly, with the heads-up display 112, the virtual images may be generated to assist an operator 30 of the MHV 10. In various examples, the heads-up display 112 may be configured to project an image from a projector 118 onto the window 116, which serves as a reflection surface and reflects the projected image to a viewer. Alternatively, the heads-up display 112 can use a separate combiner screen arranged between the operator 30 and a windscreen or mast guard of the MHV 10, wherein the combiner screen serves as the reflection surface and reflects the image that is generated by the projector 118 to the operator 30, who perceives the overlaid image as being located behind the combiner screen, as viewed by them, generally also behind the windscreen or mast guard, which is arranged behind the combiner screen, as an overlaid image.

In instances in which a heads-up display 112 is implemented, the training reinforcement assistance device 38 may continue to provide instructions for the heads-up display 112. Additionally or alternatively, various features of the training reinforcement assistance device 38 may be incorporated into the MHV 10 for detecting various conditions of the operator 30. For example, the eye-tracking system 42 may be integrated into the MHV 10 and the virtual images provided by the heads-up display 112 may be updated based on information received from the eye-tracking system 42.

Figure 6:
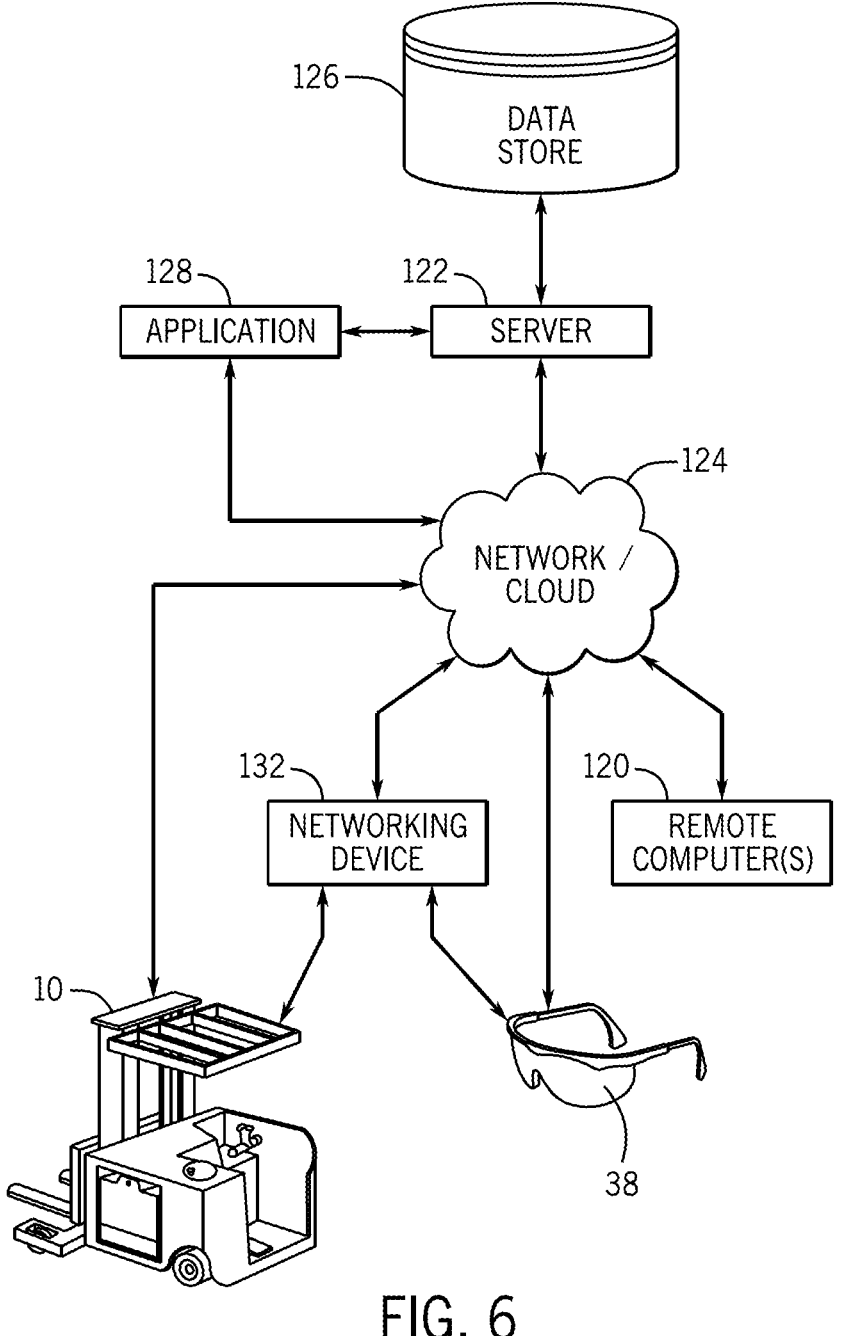
FIG. 6 is a block diagram illustrating a training reinforcement assistance device, an MHV, and a remote computer communicatively coupled with one another, according to some aspects of the present disclosure.
Figure 8:
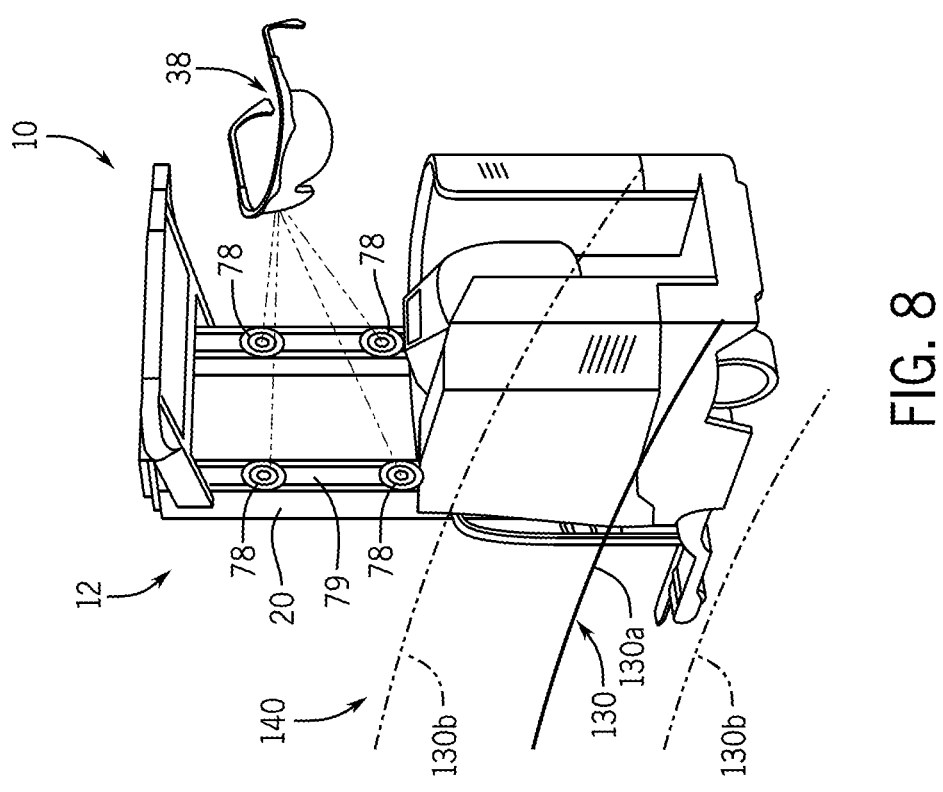
FIG. 8 is a side perspective view of an MHV and an example overlaid image generated by the training reinforcement assistance device in the form of a plurality of locus lines, according to some aspect of the present disclosure.
Figure 7:
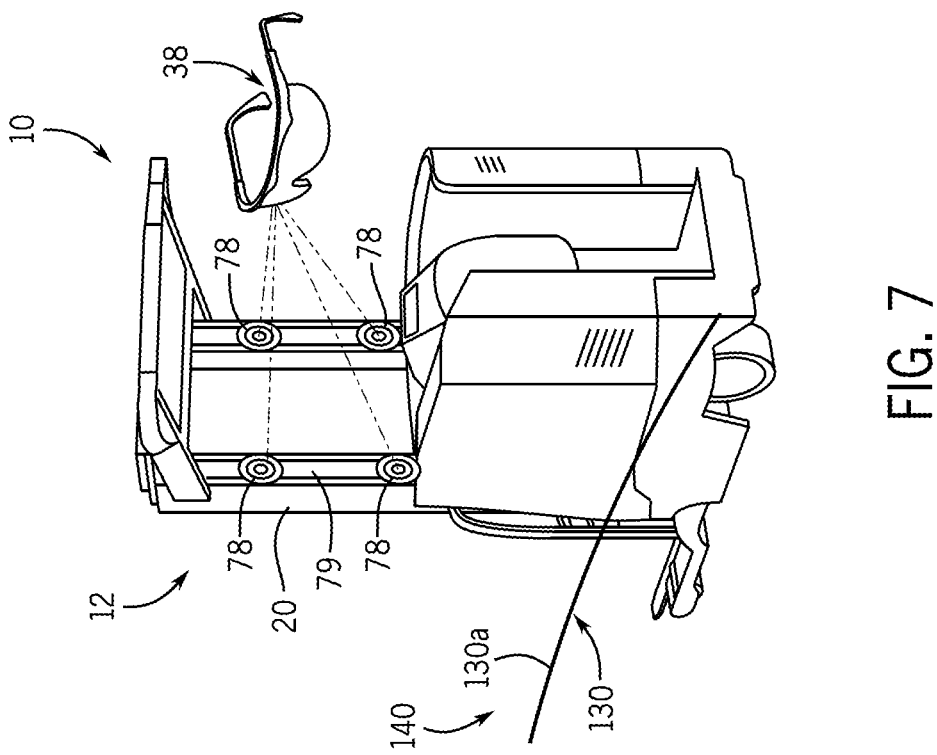
FIG. 7 is a side perspective view of an MHV and an example overlaid image generated by the training reinforcement assistance device, according to some aspect of the present disclosure.

Referring to FIG. 6, in some examples, the MHV 10, the training reinforcement assistance device 38, and/or a remote computer 120 may be communicatively coupled with one or more remote sites such as a remote server 122 via a network/cloud 124. The network/cloud 124 represents one or more systems by which the MHV 10, the training reinforcement assistance device 38, and/or the remote computer 120 may communicate with the remote server 122. Accordingly, the network/cloud 124 may be one or more of various wired or wireless communication mechanisms, including any desired combination of wired and/or wireless communication mechanisms and any desired network topology (or topologies when multiple communication mechanisms are utilized). Exemplary communication networks 124 include wireless communication networks (e.g., using Bluetooth®, IEEE 802.11, etc.), local area networks (LAN) and/or wide area networks (WAN), including cellular networks, satellite networks, microwave networks, radio frequency networks, the Internet and the Web, which all may provide data communication services and/or cloud computing services. The Internet is generally a global data communications system that is a hardware and software infrastructure, which provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g., 124 in FIG. 6). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not exactly the same, these terms are generally used interchangeably herein, and they may be referred to collectively as the network/cloud 124.

The server 122 may be one or more computer servers, each of which may include at least one processor and at least one memory, the memory storing instructions executable by the processor, including instructions for carrying out various steps and processes. The server 122 may include or be communicatively coupled to a data store 126 for storing collected data as well as instructions for operating the MHV 10, the control unit 82, the training reinforcement assistance device 38, the controller 50 of the training reinforcement assistance device 38, etc., that may be directed to and/or implemented by the MHV 10 and/or the training reinforcement assistance device 38 with or without intervention from an operator 30 and/or the remote computer 120.

In some examples, the instructions may be input through the remote computer 120 and relayed to the server 122. Those instructions may be stored in the server 122 and/or data store 126. At various predefined periods and/or times, the MHV 10 and/or the training reinforcement assistance device 38 may communicate with the server 122 through the network/cloud 124 to obtain the stored instructions, if any exist. Upon receiving the stored instructions, the MHV 10 and/or the training reinforcement assistance device 38 may implement the instructions. The server 122 may additionally store information related to multiple training reinforcement assistance devices 38, MHVs 10, routes, etc., and operate and/or provide instructions to the MHV 10 and/or the training reinforcement assistance device 38 in conjunction with the stored information with or without intervention from an operator 30 and/or the remote computer 120. Accordingly, in some examples, the operating routines 59 of the training reinforcement assistance device 38 are contained within the network/cloud 124 and the training reinforcement assistance device 38 is configured to stream data to operate the training reinforcement assistance device 38.

In some examples, throughout a shift, the training reinforcement assistance device 38 is capable of recognizing tasks such as picking and placing loads by monitoring sensors and equipment on the MHV 10. For example, the system 41 may determine that a load is picked up off the floor after recording the following pattern: the MHV 10 has no weight on one or more forks 24, the forks 24 are positioned proximate to the floor, the forks 24 are raised, and a weight on the forks 24 increases. Similarly, the system 41 may determine a load is placed on a rack after recording the following pattern: the MHV 10 has weight on one or more forks 24, the forks 24 are lifted, the forks 24 are lowered, and a weight on the one or more forks 24 is reduced. By classifying each of these sensor patterns as events such as "pick load from floor" and "place load at height," the system 41 may combine combinations of events into tasks. For example, "pick load from floor" followed by "place load at height" may constitute a single pallet 36 being put away from a floor location to the rack. Alternatively, "pick load from height" followed by "place load on floor" may constitute taking a pallet 36 down from the rack. This data can be converted into productivity metrics and communicated to the server.

With further reference to FIG. 6, the server 122 can also generally implement features that may enable the MHV 10 and/or the training reinforcement assistance device 38 to communicate with cloud-based applications 128. Communications from the MHV 10 can be directed through the network/cloud 124 to the server 122 and/or cloud-based applications 128 with or without a networking device 132, such as a router and/or modem. Additionally, communications from the cloud-based applications 128, even though these communications may indicate one of the MHV 10 and/or the remote computer 120 as an intended recipient, can also be directed to the server 122. The cloud-based applications 128 are generally any appropriate services or applications 128 that are accessible through any part of the network/cloud 124 and may be capable of interacting with the MHV 10 and/or the remote computer 120.

In various examples, the training reinforcement assistance device 38 can be feature-rich with respect to communication capabilities, i.e., have built-in capabilities to access the network/cloud 124 and any of the cloud-based applications 128 or can be loaded with, or programmed to have, such capabilities. The training reinforcement assistance device 38 can also access any part of the network/cloud 124 through industry standard wired or wireless access points, cell phone cells, or network nodes. In some examples, operators 30 can register to use the remote server 122 through the training reinforcement assistance device 38, which may provide access to the MHV 10 and/or the remote computer 120 and/or thereby allow the server 122 to communicate directly or indirectly with the MHV 10 and/or the remote computer

120. In various instances, the MHV 10 and/or the remote computer 120 may also communicate directly, or indirectly, with the remote computer 120 or one of the cloud-based applications 128 in addition to communicating with or through the server 122. According to some examples, the MHV 10 and/or the remote computer 120 can be preconfigured at the time of manufacture with a communication address (e.g., a URL, an IP address, etc.) for communicating with the server 122 and may or may not have the ability to upgrade or change or add to the preconfigured communication address.

Referring still to FIG. 6, when a new cloud-based application 128 is developed and introduced, the server 122 can be upgraded to be able to receive communications for the new cloud-based application 128 and to translate communications between the new protocol and the protocol used by the MHV 10 and/or the remote computer 120. The flexibility, scalability, and upgradeability of current server technology render the task of adding new cloud-based application protocols to the server 122 relatively quick and easy.

In addition, in various examples, during use, various events and maneuvers of the MHV 10 by an operator 30 can be logged and communicated to the server for data analytics and reporting. The connection to the MHV 10 may double as a communication bridge to these central servers and/or a telematics system. In various examples, the training reinforcement assistance device 38 may identify operators 30 by facial recognition, badge scanning, PIN number, or via communication to the MHV 10 for login credentials. The use of the training reinforcement assistance device 38 may begin at the start of the shift. In some examples, intelligence in the training reinforcement assistance device 38 can confirm that the operator 30 is checking and/or verifying certain items. For example, the imager 72 can confirm that the operator 30 is looking at a wheel 14 when answering questions about wheel condition.

In some examples, the training reinforcement assistance device 38 may also be utilized for performance tracking and the training reinforcement assistance device 38 can allow for passive monitoring of performance without requiring any effort on the part of the operator 30. This can improve accuracy and does not take the operator 30 away from productive activities. In addition, the training reinforcement assistance device 38 may store images (or videos) from the imager 72 and/or images (or videos) may be sent to the cloud and stored on the server. The videos may provide a live feed or a previous task that can provide insight of a task or maneuver of the MHV 10. The training reinforcement assistance device 38 can also assess how much time the operator 30 spends in each step of the load handling process (traveling, lifting, side shifting forks 24, multiple attempts to align the forks 24, etc.) or any other data. A warehouse manager can use this information to benchmark the operator 30 against their peers and identify which operators 30 could use additional training and in which areas.

In addition, in various examples, the compiled data can be utilized to provide focused training to operators 30 to improve their skills. Engineered labor standards can be created for each pallet 36 move given the starting and ending locations to normalize the variable level of effort required for each move. The compiled data and analysis thereof can provide a metric of operator performance while also being able to capture variable or random events during the operator's shift that affect productivity but are difficult to capture and quantify. For example, waiting at intersections, waiting for pedestrians, and waiting for other vehicles 10 may occur during operation, but may be considered non-value-add tasks that can be recorded and optimized.

Referring to FIGS. 7-10, as provided herein, fiducials or fiducial markers 78 may be positioned on the MHV 10. In some examples, the MHV 10 can communicate parameters about its geometry to the training reinforcement assistance device 38, including the fiducials 78 relative to the vehicle body 12. For example, in some instances, the fiducials 78 may be configured as one or more barcodes that encode the static vehicle geometry information and communicate it to the training reinforcement assistance device 38. In addition, using the one or more barcodes may encode a unique vehicle ID that can be cross referenced in a database to look up the relevant static vehicle information. In response, the MHV 10 can communicate its unique ID, steer angle, and speed to a central server. In some examples, anyone with a training reinforcement assistance device 38 can look at the MHV 10, read the unique ID, and see its projected path overlaid on their view as oriented relative to that MHV 10. In addition, remote operators 30 may also connect to a specific training reinforcement assistance device 38 and MHV 10 combination and be able to remotely view the working environment from the training reinforcement assistance device 38 through the imager 72 and/or the overlaid image produced by the training reinforcement assistance device 38 and seen by the operator 30 of the MHV 10. In some instances, the remote viewer may also alter various functions of the training reinforcement assistance device 38 and/or the MHV 10 through the remote computer 120.

In some examples, the control unit 82 and/or the network/cloud 124 may communicate additional information about the MHV 10 to the controller 50 of the training reinforcement assistance device 38, such as the wheelbase, overall width, and so on. The MHV 10 may also communicate vehicle kinematic information, such as a steering angle or propulsion drive system 106 conditions to the controller 50. In response, the controller 50 may provide instructions to the display 74 for providing a virtual image in a predefined location. The predefined location may also consider the pupil axis of the operator 30 as sensed by the eye-tracking system 42. In some examples, the virtual image may be configured as an overlaid image that is presented to the operator 30 that includes static and/or dynamic locus lines 130 to aid the operator 30 in maneuvering the MHV 10 to a target location. As the operator 30 turns the steering wheel, the steering angle sensor 100 can send steering wheel angle data to the control unit 82 and/or the controller 50. The controller 50 may analyze the data coming from the steering angle sensor 100, along with other vehicle data, including the gear ratio, wheel base size, wheel radius, and vehicle speed data, and calculate a size and direction for the static and/or dynamic locus lines 130 to be displayed as an overlay on the display 74. In some instances, the overlaid image may be configured as one or more dynamic and/or static locus lines 130. For example, the locus lines 130 includes a first line 130a that is generally aligned with a center longitudinal axis of the MHV 10 (see, e.g., FIG. 7). In these instances, when the MHV 10 includes forks 24 that extend in a direction parallel to the longitudinal axis, the first line 130a may be arranged between the forks 24. In some instances, the locus lines 130 may include the first line 130a and a pair of outer lines 130b that generally align with an outer width of the body 12 of the MHV 10 (or a predefined distance outwardly of the body 12) (see, e.g., FIG. 8). In general, the pair of outer lines 130b may defined the same shape, direction, and length as the first line 130a.

The dynamic locus lines 130 displayed can have a direction that may be determined in response to a change in the steering wheel angle and other vehicle data related to wheel base, radius, and gear ratio. Each step of calculating dynamic locus lines 130 can depend on the turning radius and the current steering wheel angle of the MHV 10, so the locus lines 130 can change as the steering wheel angle is changed. As the operator 30 turns the steering wheel, each step and direction the steering wheel moves can be reflected in the locus line direction as displayed. Each time the steering angle changes, a replacement set of dynamic locus lines 130 can be displayed. In this respect, the dynamic locus lines 130 can display a true path of the MHV 10 so that the operator 30 can get a sense of where the MHV 10 is headed as they turn the steering wheel and approach their desired destination. As used herein, "dynamic locus lines" means that the locus lines 130 may be updated based on the changed vehicle position and/or kinematics.

As the steering wheel angle moves from a center position, not only the direction of the dynamic locus lines 130 can be adjusted but the length of the locus lines 130 may also be adjusted accordingly. For example, as the steering wheel is turned away from center, the locus line length may be increased. As the steering wheel is turned towards center, the locus lines 130 may be decreased in length. The dynamic locus lines 130 have a maximum length at a steering wheel angle that is furthest from center and a minimum length at a steering wheel angle that is at center.

For each change in steering wheel angle, the controller 50 can recalculate and display the dynamic locus lines 130 at the adjusted angle and length. At a maximum angle, either left or right of center, the locus lines 130 can extend to a maximum length dimension. The dynamic locus lines 130 can provide the accurate projected vehicle path. The operator 30 can be provided a true indication of where the MHV 10 is headed based on the steering wheel angle position and the vehicle wheel base information. The true vehicle path, as opposed to a vehicle path to a target, can provide the operator 30 with the ability to reach a desired location, knowing the direction the MHV 10 is headed by the locus lines 130 displayed on the display 74, which can be provided as an overlaid image 140.

In various examples, additional factors, such as wheel slippage, tire wear, tire deformation, load and/or battery weight, tolerances in steer angle measurement, or vehicle maintenance or repair may also be sensed by one or more sensors of the MHV 10 and/or the additional vehicle data may be manually inputted to further update the locus lines 130. In some examples, a first locus line 130 in the center of the vehicle's path can be projected through the training reinforcement assistance device 38 for the operator 30 to reference (see, e.g., FIG. 7). Additionally and/or alternatively, a pair of locus lines 130 may be provided on the display 74 as an overlay that indicate the path of the vehicle's envelope plus a margin can be positioned in real space relative to the known geometry of the MHV 10 as communicated to the training reinforcement assistance device 38 by the fiducials 78 on the MHV 10.

In various examples, the MHV 10 includes fiducials 78 arranged on the vehicle body 12 of the MHV 10. In the illustrated example, the fiducials 78 include four fiducials 78 arranged on the vehicle body 12. In other examples, the MHV 10 may include more or less than four fiducials 78. In the illustrated example, the fiducials 78 are arranged on a first operator-facing surface or structure 79 of the vehicle body 12. That is, the fiducials 78 are arranged on a first operator-facing surface 79 of the vehicle body 12 that are visible by the camera 62 and/or the imager 72, when an operator's field of view is directed in a first or forward travel direction (e.g., a direction toward the forks 24).

Figure 10:
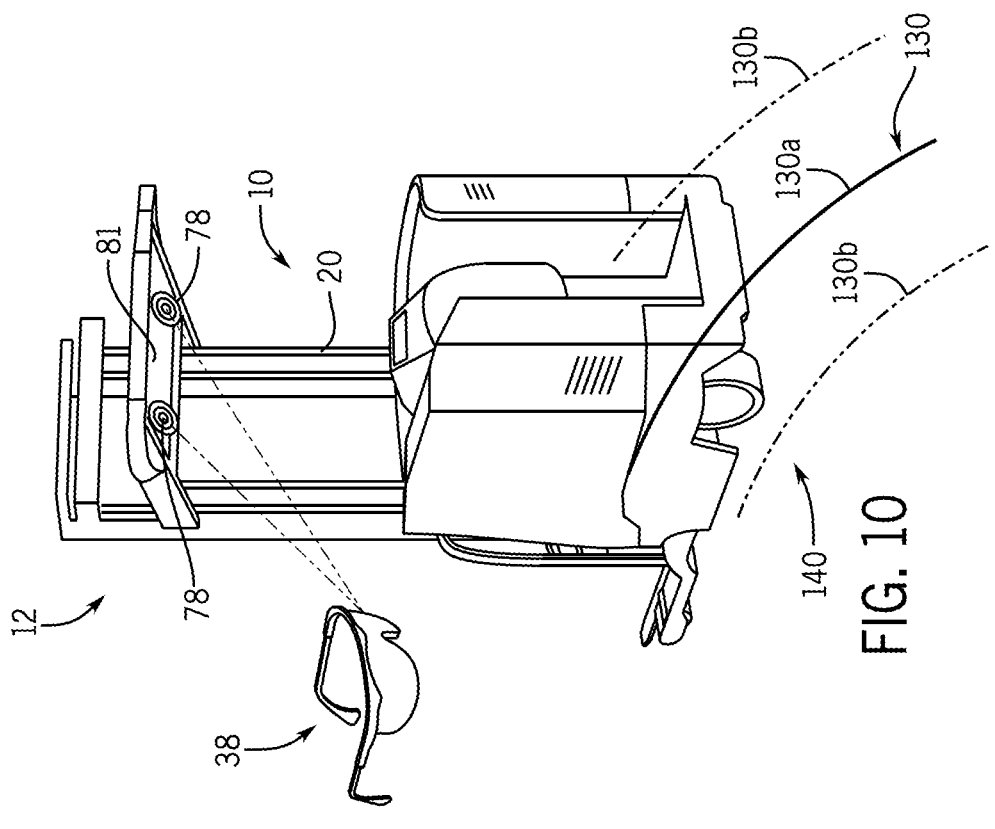
FIG. 10 is a side perspective view of the MHV and an example overlaid image generated by the training reinforcement assistance device in the form of a plurality of locus lines extending rearward of the MHV, according to some aspect of the present disclosure.
Figure 9:
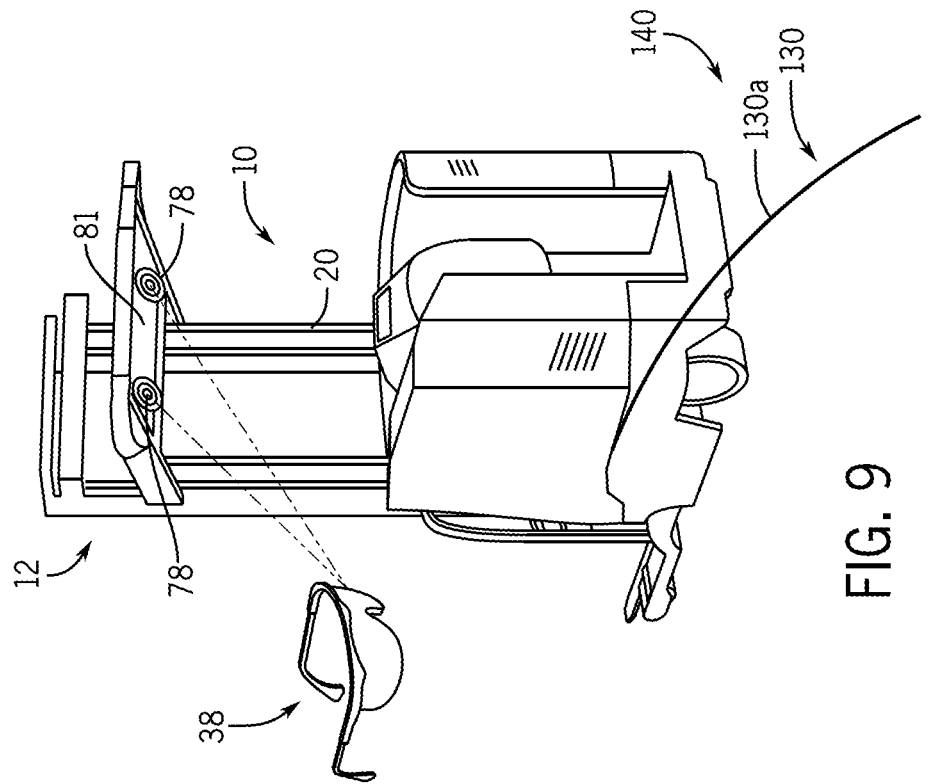
FIG. 9 is a side perspective view of an MHV and an example overlaid image generated by the training reinforcement assistance device extending rearward of the MHV, according to some aspect of the present disclosure.

Referring to FIGS. 9 and 10, in some examples, the MHV 10 may be operated in more than one direction. Additionally, the turning characteristics of the MHV 10 in each operating direction may be known and predictable given the vehicle's geometry, steer angle, among other kinematics. With this information, a turning radius of the MHV 10 can be determined and communicated to the operator so they better understand the path the MHV 10 may take while operating in a first direction or a second opposing direction. Accordingly, the MHV 10 includes a fiducial 78 positioned in various locations that allow for the training reinforcement assistance device 38 to determine a direction of the training reinforcement assistance device 38 relative to the MHV 10 based on the fiducials 78 recognized by the training reinforcement assistance device 38 through the imager 72. For example, the MHV 10 includes the fiducials 78 arranged on the first operator-facing surface 79 (see, e.g., FIGS. 7 and 8), and includes additional fiducials 78 arranged on a second operator-facing surface or structure 81 of the vehicle body 12. The fiducials 78 arranged on the second operator-facing surface 81 are visible by the camera 62 and/or the imager 72, when an operator's field of view is directed in a second or reverse travel direction (e.g., a direction away from the forks 24).

Additionally and/or alternatively, the training reinforcement assistance device 38 may utilize any other component therein for determining a direction and position of the training reinforcement assistance device 38 relative to the MHV 10. Further, the controller 50, the control unit 82, and/or a remote server may include machine learning algorithms that can be used to identify the position of the MHV 10 relative to the training reinforcement assistance device 38 based on inputs from the training reinforcement assistance device 38 and/or the MHV 10.

Regardless of the travel direction of the MHV, once the fiducials 78 are located by the imager 72 on the training reinforcement assistance device 38, the position of the training reinforcement assistance device 38 relative to the vehicle body 12 can be calculated so that the vehicle path (i.e., the locus lines 130) can be overlaid through the optical system 46 while considering various vehicle driving conditions, such as steer angle, vehicle speed and direction, etc. As provided herein, the controller 50 of the training reinforcement assistance device 38, the control unit 82 of the MHV 10, and/or a remote database may perform various calculations to determine the locus lines 130 to project and transform the image 140 to provide the correct perspective for the operator 30 such that the operator 30 sees the locus lines 130 projected where the MHV 10 is expected to go based on the current vehicle conditions and/or operator position. Thus, operators 30 may be able to see a projected path of the MHV 10 as indicated by one or more locus lines 130, which may assist in guidance of the MHV 10 as the operator is learning the driving characteristics of the MHV, for example during training, whether or not they are familiar with the driving characteristics of the MHV 10. In addition, various operators 30 can see the projected path of the MHV 10 and more efficiently learn to maneuver the MHV 10 for performing a task, such as picking or placing loads.

Referring to FIGS. 11-22, in some examples, an image 140 or hologram is overlaid over the work element, such as the forks 24, of the MHV 10 to aid the operator 30 in aligning the MHV 10 with a predefined location, such as openings of a pallet 36. The overlaid image 140 can serve as a jig for the operator 30 to be able to position the MHV 10 in the predefined location to handle loads and minimize aisle width requirements. In some examples, the driver assistance system 41 provided herein may temporarily control steering during a right-angle stacking event after the operator 30 has positioned the MHV 10 appropriately. In such instances, the operator 30 can control the throttle and the MHV 10 can automatically manipulate the steer angle so that the MHV 10 takes an idealized path to complete a task, such as picking up or depositing a load. In any fashion, the operator 30 can remain in control of the MHV 10 during performance of any actions.

In various examples, the MHV 10 can provide the position of the forks 24 to the training reinforcement assistance device 38, including height, tilt, side shift, and reach relative to the vehicle's body 12. Additionally or alternatively, the MHV 10 may also communicate various dimensions and/or kinematics of the MHV 10, such as wheelbase, overall width, and the vehicle's steer angle. In some cases, by knowing the wheelbase, position of the steered wheel, and the steering angle, the vehicle's path is known or can be calculated. With this known or calculated path, the training reinforcement assistance device 38 may display an image 140 representing the path on the floor on a portion of the MHV 10 or any other practicable location. Additionally or alternatively, the image 140 may also represent the envelope of the vehicle's projected path, which may be offset by a target distance when approaching a pallet 36 for right angle stacking.

In various examples, the image 140 provided by the display 74 may be composed of geometric shapes specific to the MHV's geometry, handling characteristics, and a specified load size. For example, the overlaid image 140 may be centered at the point around which the vehicle pivots when at maximum steer angle. In some instances, two radii can be drawn from this point: one to represent the sweep of the empty forks 24 and the other to represent the sweep of a specified load size. A width of the overlaid image 140 can be determined by the manufacturer's recommended distance for approaching a pallet 36 for that specific MHV type when right angle stacking, or specific control of the MHV 10 during any other maneuver.

Figure 11:
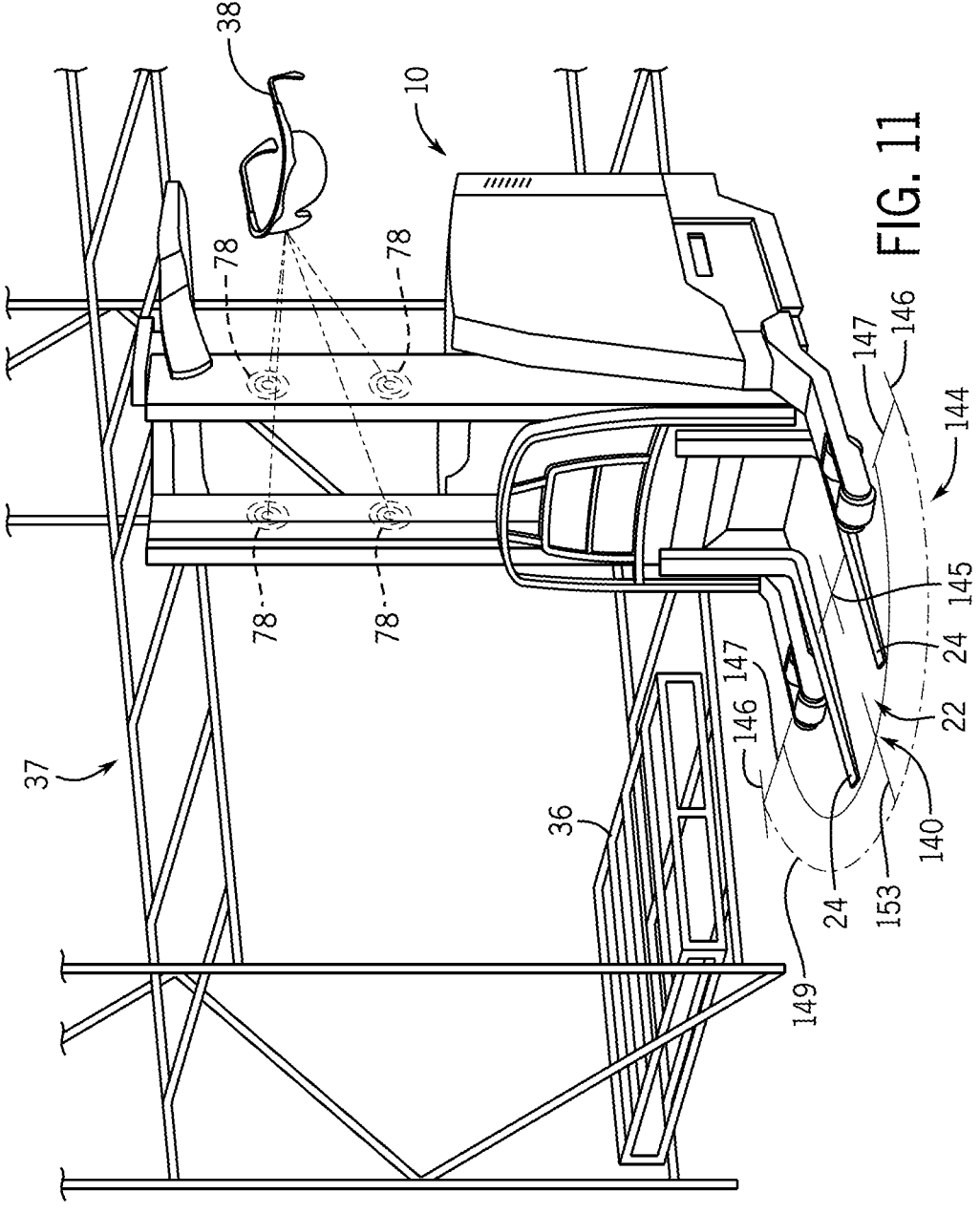
FIG. 11 is a side perspective view of an MHV with an overlaid image forwardly of the MHV and a storage rack adjacent to the MHV, according to some aspects of the present disclosure.
Figure 12:
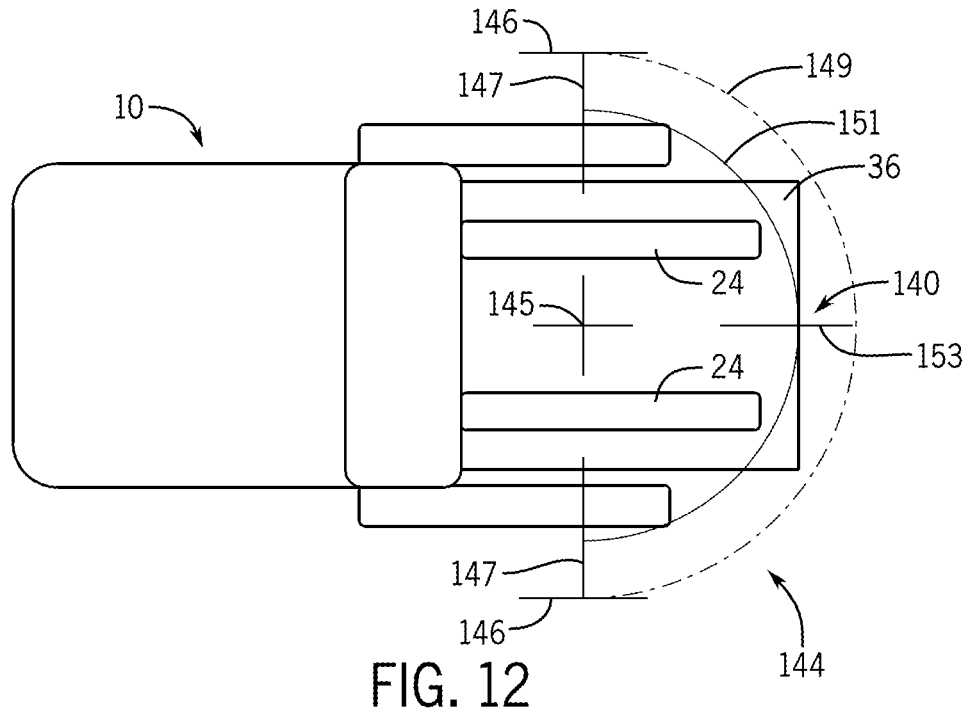
FIG. 12 is a top view of the MHV and the overlaid image of FIG. 11, according to some aspects of the present disclosure.

As illustrated in FIGS. 11 and 12, the image 140 can include one or more reference marks 144 specific to the vehicle's geometry and can be configured to assist the operator 30 in positioning the MHV 10 in a predefined location. For example, the overlaid image 140 can include a pivot point 145 illustrated by two perpendicularly intersecting lines. The pivot point 145 is defined as the point around which the MHV 10 pivots when the steering angle is set to a maximum steering angle. In general, the pivot point 145 can assist the operator in positioning the forks 24 of the MHV 10 at a center region of the intended pallet 36 at the distance the reference mark 144 measures out. The one or more reference marks 144 further include two laterally-extending lines 147 that extend outwardly along a line that intersects the pivot point 145. The lines 147 begin at a point that is laterally outwardly from the forks 24 and extend outwardly past an outermost edge or side of the MHV 10 a distance that defines an outer radius 149. Boundary lines 146 intersect each of the lines 147 at an outermost point on each of the lines 147 and extend in a direction perpendicular to the lines 147 (e.g., in a direction parallel to the forks 24 or the sides of the MHV 10). The outer radius 149 generally corresponds with the radius swept by outermost points of a load or pallet on the forks 24 when the MHV pivots along the maximum steering angle. The outer radius 149 extends between the intersection points of the lines 147 and the boundary lines 146. The reference marks 144 further include an inner radius 151, a forward-facing line 153. The inner radius 151 corresponds with the radius swept by the outermost points of the forks 24 when the MHV pivots along the maximum steering angle. The forward-facing line 153 extends outwardly in a direction parallel to the forks 24 and extends in a direction that intersects with the pivot point 145.

Figure 13:
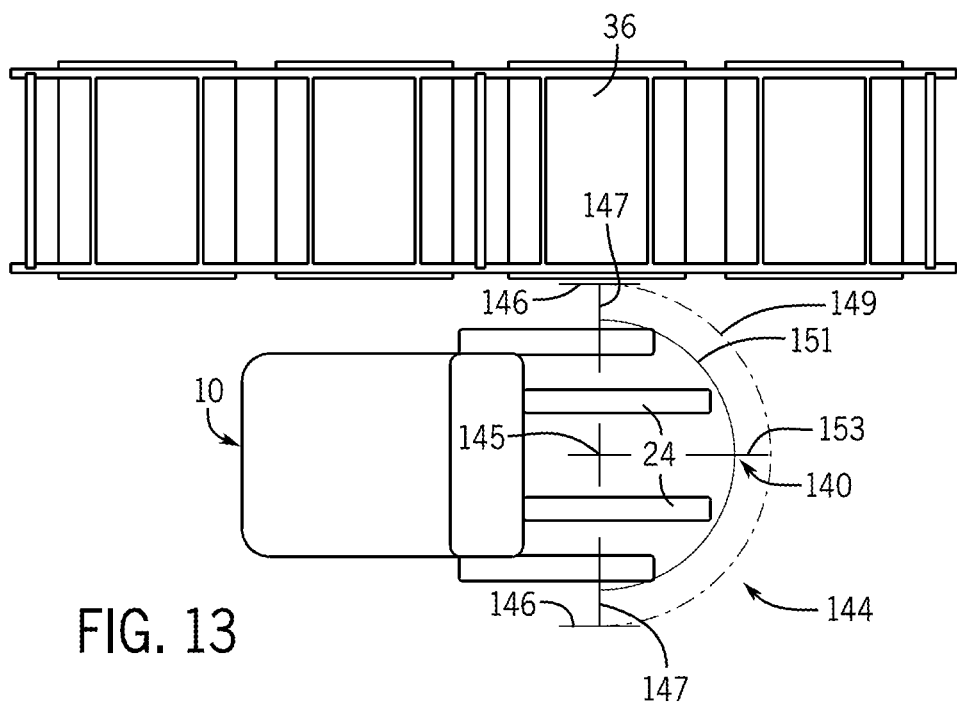
FIG. 13 is a top view of an MHV proximate to a storage rack, according to some aspects of the present disclosure.
Figure 14:
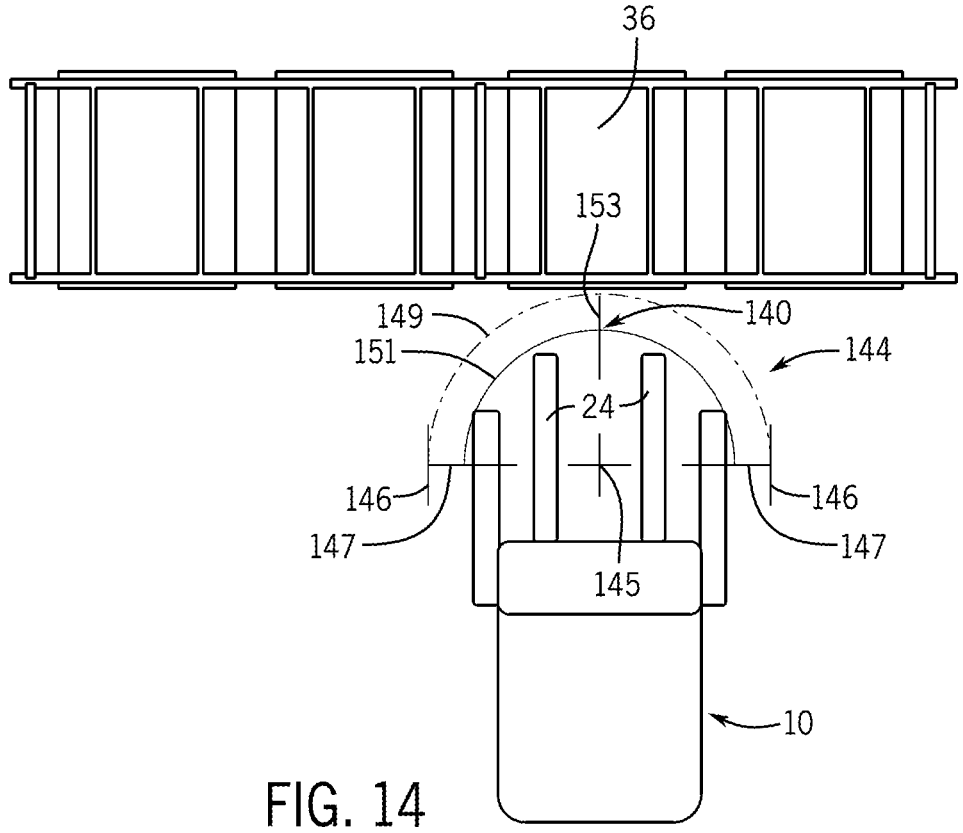
FIG. 14 is a top view of the MHV facing the storage rack of FIG. 13, according to some aspects of the present disclosure.

Turning to FIGS. 13 and 14, the image 140 overlaid on the display 74 of the training reinforcement assistance device 38 can help the operator 30 train and perform a right-angle pickup of a load or pallet 36. For example, the operator 30 can instruct the MHV 10 to approach a racking structure 37 that includes the pallet 36. The operator 30 can position the MHV 10 so that the reference marks 144 position the MHV 10 to engage and pick the pallet 36. For example, when approaching the racking structure 37, the operator 30 can reference the outer radius 149 to assess the clearance needed when turning the MHV 10. The operator 30 can also position the MHV 10 so that at least one of the lines 147 (i.e., the line 20 extending from the side of the MHV 10 that is adjacent to the racking structure 37) align with the center of the pallet 36 (e.g., the line 147 may align, or be parallel to, the center stringer on the pallet 36). In this way, the image 140 can aid the operator 30 in aligning the pivot point 145 with the center of the pallet 36. The operator 30 can then turn the steering wheel to the maximum steer angle and pivot the MHV 10 until the forward-facing line 153 aligns with the center stringer of the pallet 36. The operator 30 can then straighten out the steering and pick up the pallet 36. After picking up the pallet 36, the operator 30 can reference the outer radius 149 to estimate the clearance needed when turning the MHV 10.

Figure 15:
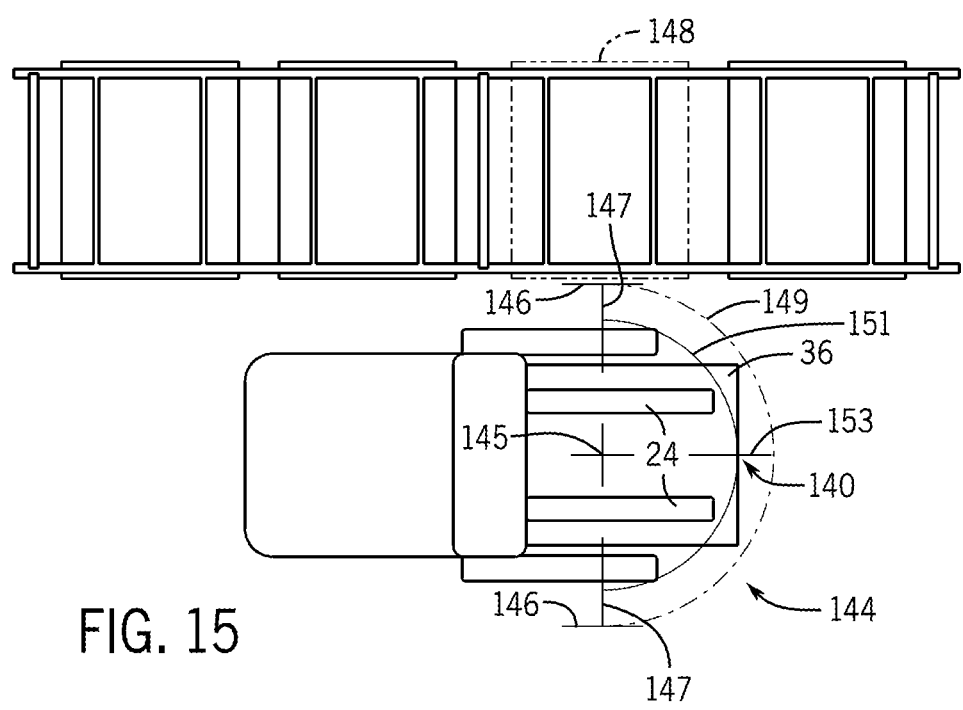
FIG. 15 is a top view of an MHV proximate to a storage rack with an overlaid image of an intended drop location, according to some aspects of the present disclosure.
Figure 16:
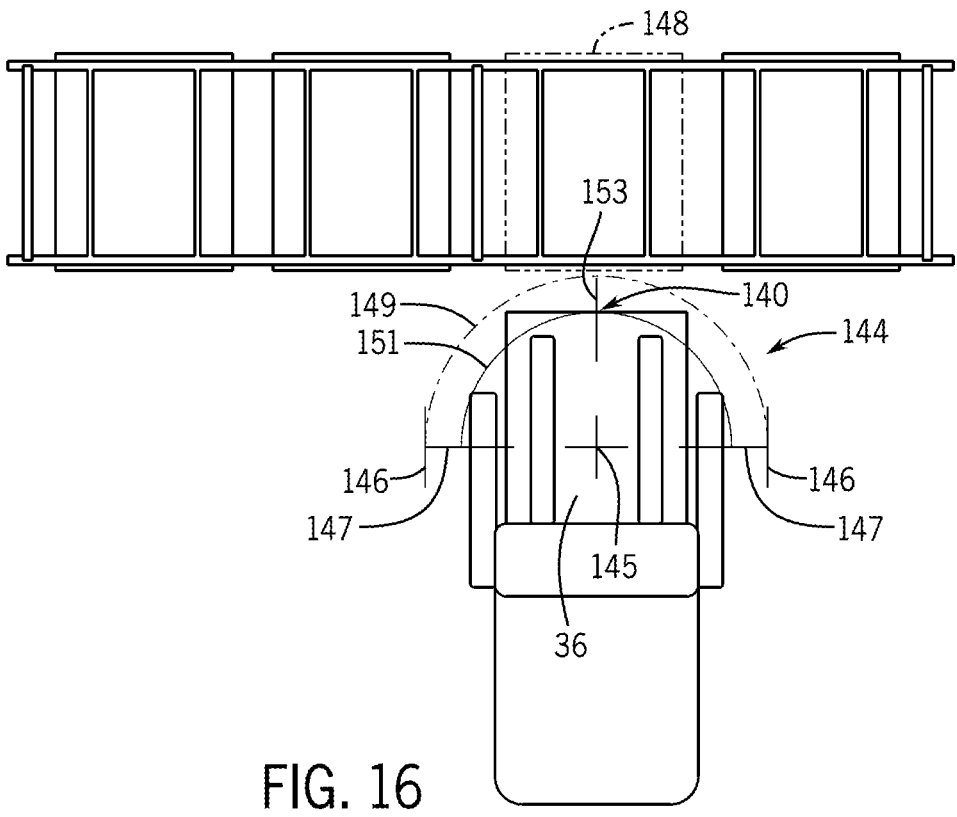
FIG. 16 is a top view of the MHV facing the storage rack of FIG. 15, according to some aspects of the present disclosure.

Referring to FIGS. 15 and 16, in various examples, the overlaid image 140 can be used in much the same way during pallet 36 put away on the racking structure 37. For example, when placing the pallet 36 in a predefined location, the operator 30 can align the reference marks 144 provided within the overlaid image 140 with the center of the intended drop location 148 instead of a center stringer of the pallet 36. Specifically, when approaching the racking structure 37, the operator 30 can reference the outer radius 149 to assess the clearance needed when turning the MHV 10. The operator 30 can also position the MHV 10 so that at least one of the lines 147 (i.e., the line extending from the side of the MHV 10 that is adjacent to the racking structure 37) align with the center of intended drop location 148. In this way, the image 140 can aid the operator 30 in aligning the pivot point 145 with the center of the intended drop location 148. The operator 30 can then turn the steering wheel to the maximum steer angle and pivot the MHV 10 until the forward-facing line 153 aligns with the center of the intended drop location 148. The operator 30 can then straighten out the steering and drop off the pallet 36 on the racking structure 37 in the intended drop location 148. After depositing the pallet 36, the operator 30 can reference the outer radius 149 to estimate the clearance needed when turning the MHV 10.

Figure 17:
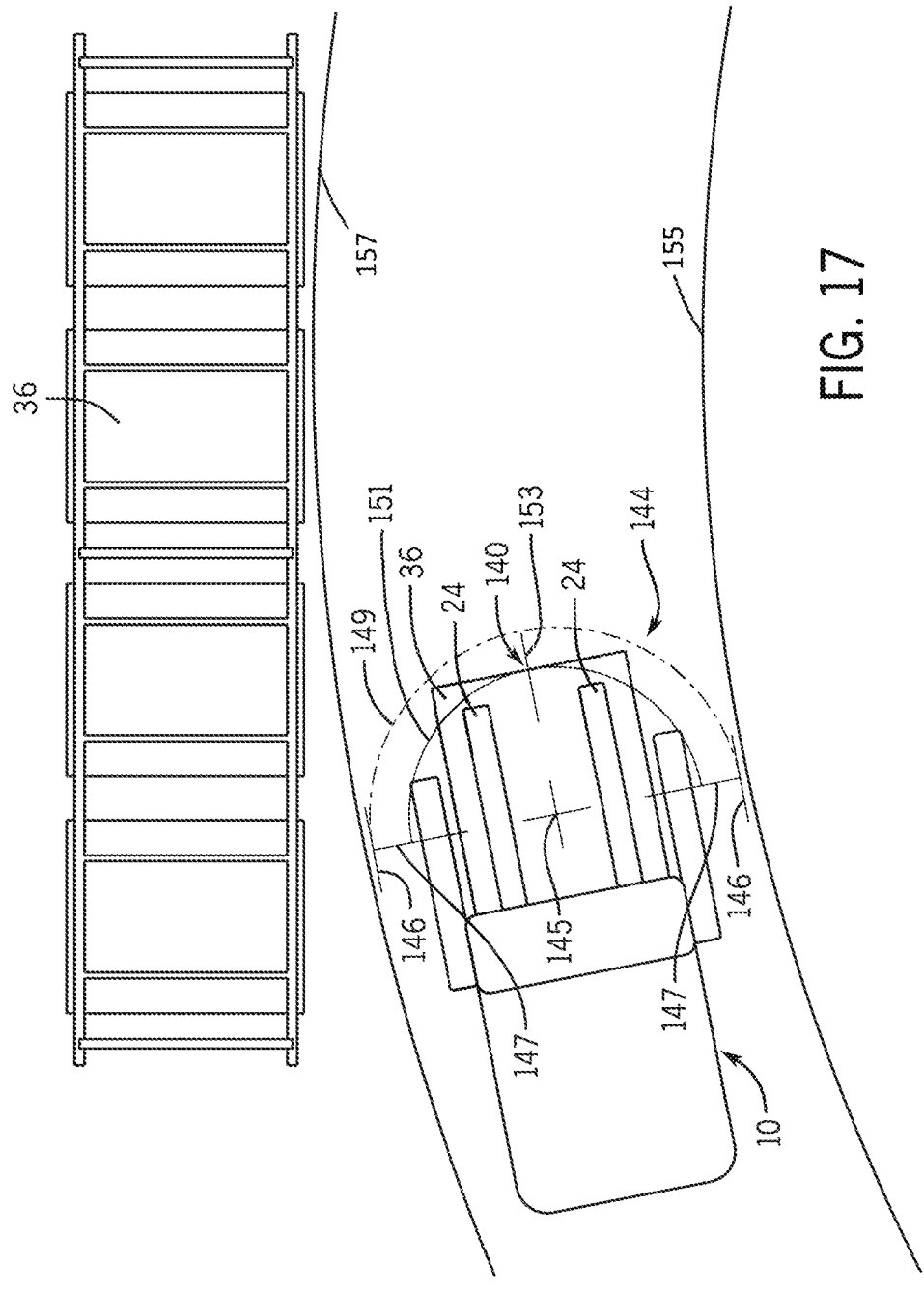
FIG. 17 is a top view of the MHV approaching a storage rack, according to some aspects of the present disclosure.

Referring to FIG. 17 in some examples, the overlaid image 140 provided by the display 74 may include path projections that align with a floor to indicate the expected path of the MHV's offset envelope to help the operator position the MHV 10 as they approach a target pallet 36 or a racking structure 37 from a distance. For example, the projected path can include a first path line 155 and a second path line 157. In some examples, the first path line 155 and the second path line 157 may be included in the overlaid image 140 in addition to the locus lines 130 described herein. In some examples, the first path line 155 and the second path line 157 may be included in the overlaid image 140 in place of the pair of outer lines 130b, or may take the form of the outer lines 130b. In the illustrated example, the first path line 155 and the second path line 157 are spaced from the sides of the MHV 10 a distance that corresponds with the different between the inner radius 151 and the outer radius 149 (i.e., the first path line 155 and the second path line 157 generally align with and extend through the lines 147 of the reference marks 144).

Figure 18:
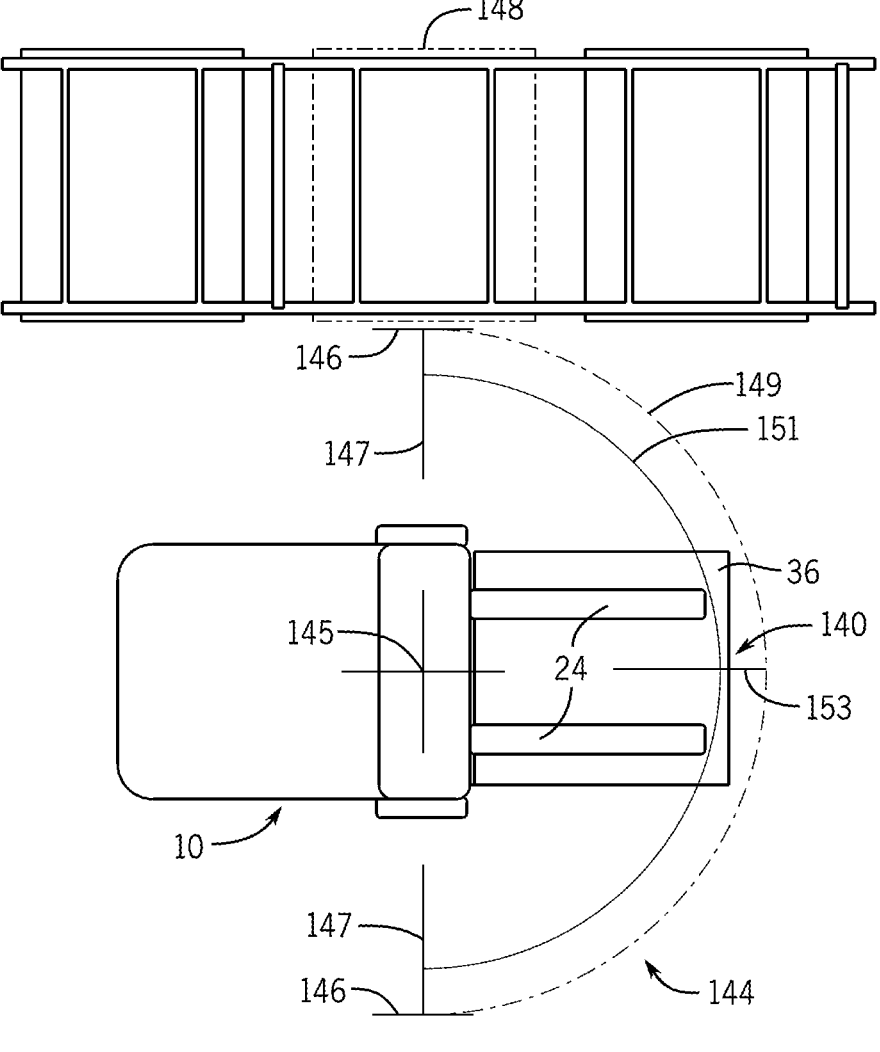
FIG. 18 is a top view of an MHV adjacent to an opening in a storage rack, according to some aspects of the present disclosure.

As described herein, the training reinforcement assistance device 38 can be provided with or inherently know the performance and geometric properties of the MHV 10. In this way, for example, the training reinforcement assistance device 38 can adapt the overlaid image 140 to adjust the reference marks 144 to account for variations in MHV geometry and MHV type. For example, and as shown in FIG. 18, in the case of a standup counterbalanced MHV, the pivot point 145 can be proximate to the center of the drive wheel axis and the overlaid image 140 can be adapted to account for the vehicle kinematics based on position of the pivot point 145, and the inner radius 151 and the outer radius 149 are adapted accordingly.

Figure 19:
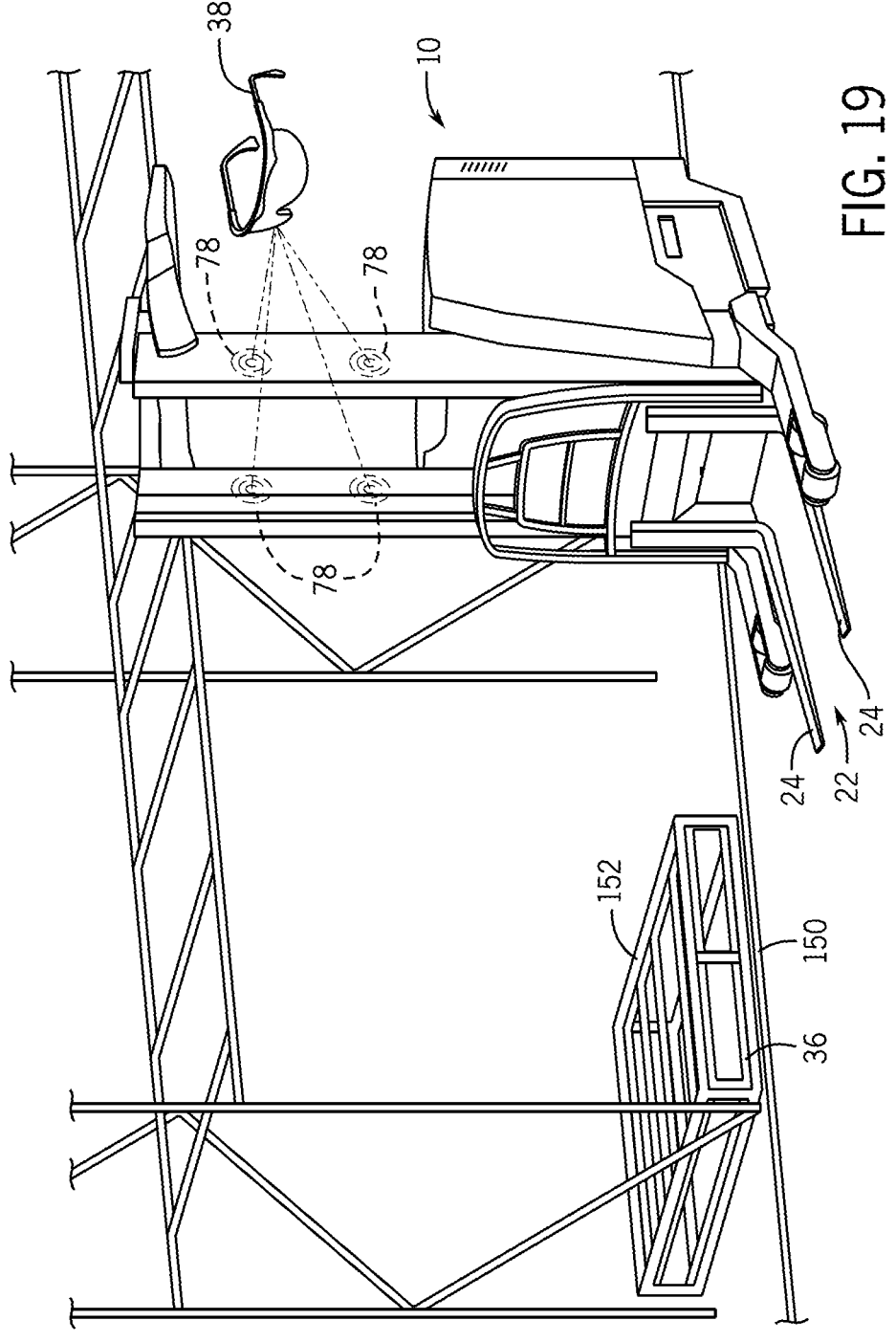
FIG. 19 is a front perspective view of an MHV and a highlighted pallet on a storage rack, according to some aspects of the present disclosure.

Referring to FIG. 19, the overlaid image 140 may include an indicator 150, such as a line parallel to the primary direction, of travel of the MHV 10 to be aligned with one or more rack uprights 39 on the racking structure 37. The overlaid image 140 may also highlight a predefined or intended position of an object to be manipulated by the MHV 10 that can be represented in real space. For example, the overlaid image 140 may provide an outline 152 showing the pallet 36 position ready to be handled. In the illustrated example, the outline 152 is defined around a periphery of the pallet 36. The MHV 10 can also communicate the vehicle type and geometry to the training reinforcement assistance device 38 so that the overlaid image 140 can be accurately located for that specific MHV 10 (e.g., based on the pivot point 145 and the associated reference marks 144).

In some examples, the outline 152 can serve to communicate to the operator which pallet is being targeted for automated, semi-automated, or assisted handling. The outline 152 can represent an outline that is placed in a fixed location relative to the frame of the vehicle (e.g., offset in the forks-first and lateral direction) so that by aligning the intended pallet with this outline 152, the onboard or off-board vehicle control systems such as cameras and/or machine learning computers can narrow their search area for identifying the dimensional position of a pallet to be handled. The onboard or off-board vehicle control systems can be continuously searching and identifying patterns that fit its criteria of what constitutes a load to be handled. The onboard or off-board vehicle control systems with machine learning can communicate the positions of loads it has identified so they can be visualized through the training reinforcement assistance device 38. A camera, for example camera 62, can be used to identify loads, and has a known location and orientation on the vehicle and therefore the outline 152 of the identified load can be represented relative to the MHV 10. This position can be communicated to the training reinforcement assistance device 38, which can visualize the outline 152 in that same position relative to the MHV 10 by localizing itself using the fiducials 78. The operator may then select the intended load to be handled simply by looking at it. Eye tracking from the training reinforcement assistance device 38 coupled with the orientation of the training reinforcement assistance device 38 can be communicated to the vehicle control systems with machine learning as a vector or pair of vectors (e.g., one for each eye). The intersection of this vector or vectors with the three-dimensional position of identified loads' outlines can then be used to select the load to be handled.

Once a load has been selected for automated, semi-automated, or assisted handling, the onboard or off-board vehicle control system can plan a path to interface with the load that is capable of being executed by the vehicle's particular geometry. After path planning, a motion control algorithm can manipulate the vehicle's steer angle as the operator drives the vehicle in a way to follow the set path.

In general, the overlaid image 140 may include any combination of the locus lines 130, the reference marks 144, the indicator 150, and/or the outline 152. In some examples, the training reinforcement assistance device 38 may adaptively change the contents of the overlaid image 140 depending on the task being performed by the MHV 10 or the training exercise.

Figure 20:
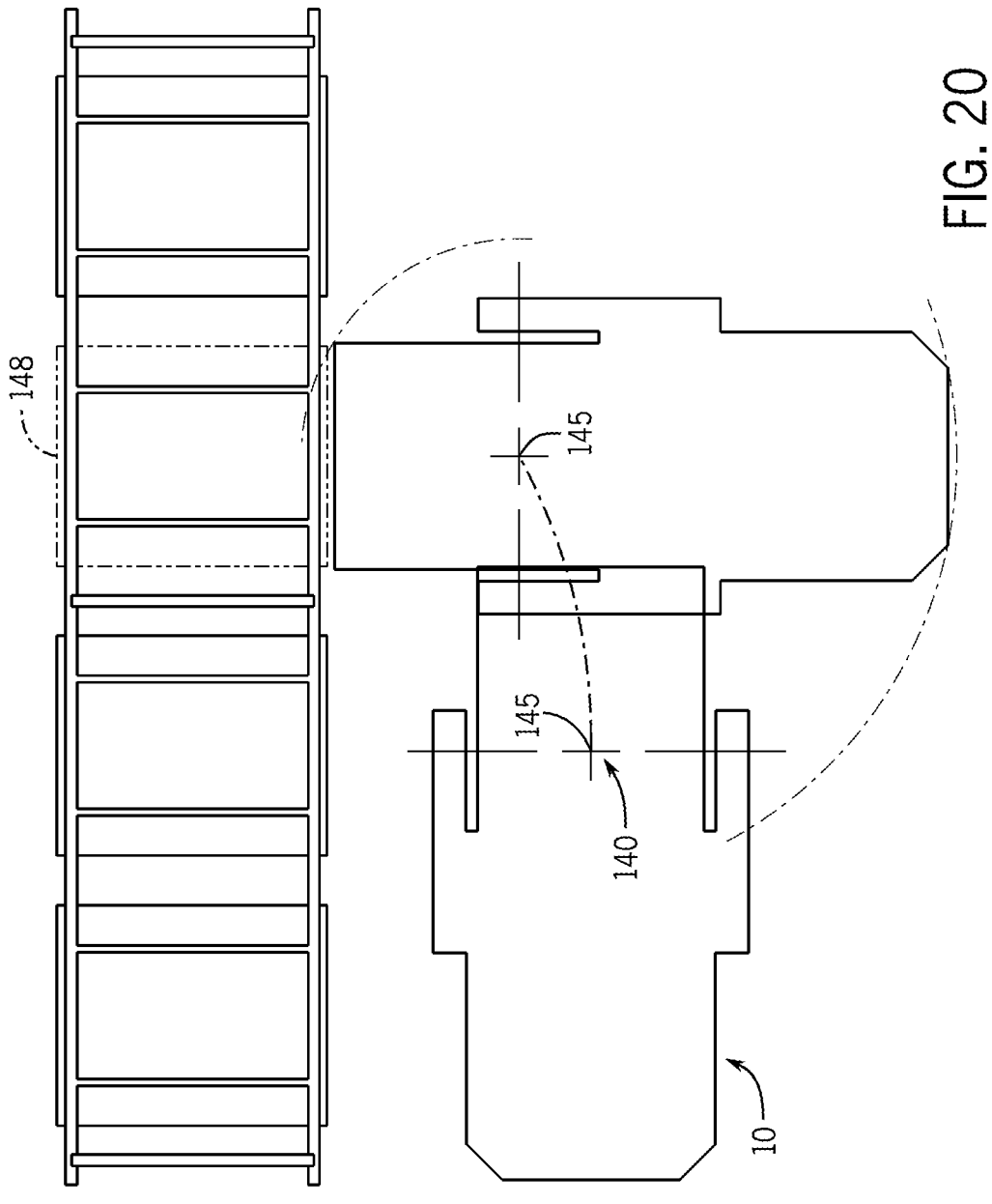
FIG. 20 is an illustrated example of a movement pattern that an MHV may take to approach a pallet on a storage rack, according to some aspects of the present disclosure.
Figure 21:
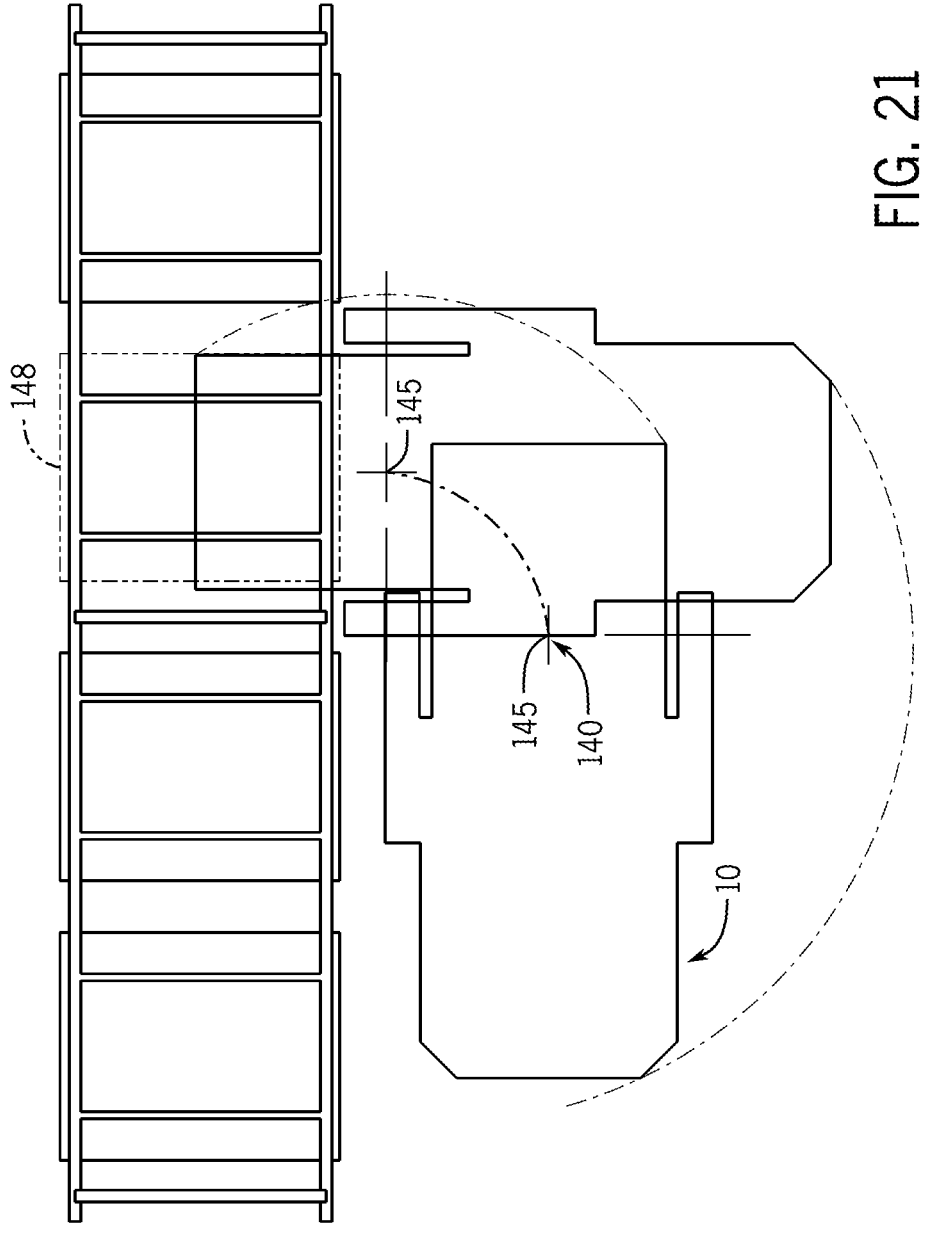
FIG. 21 is an illustrated example of another movement pattern that an MHV may take to approach a pallet on a storage rack, according to some aspects of the present disclosure.
Figure 22:
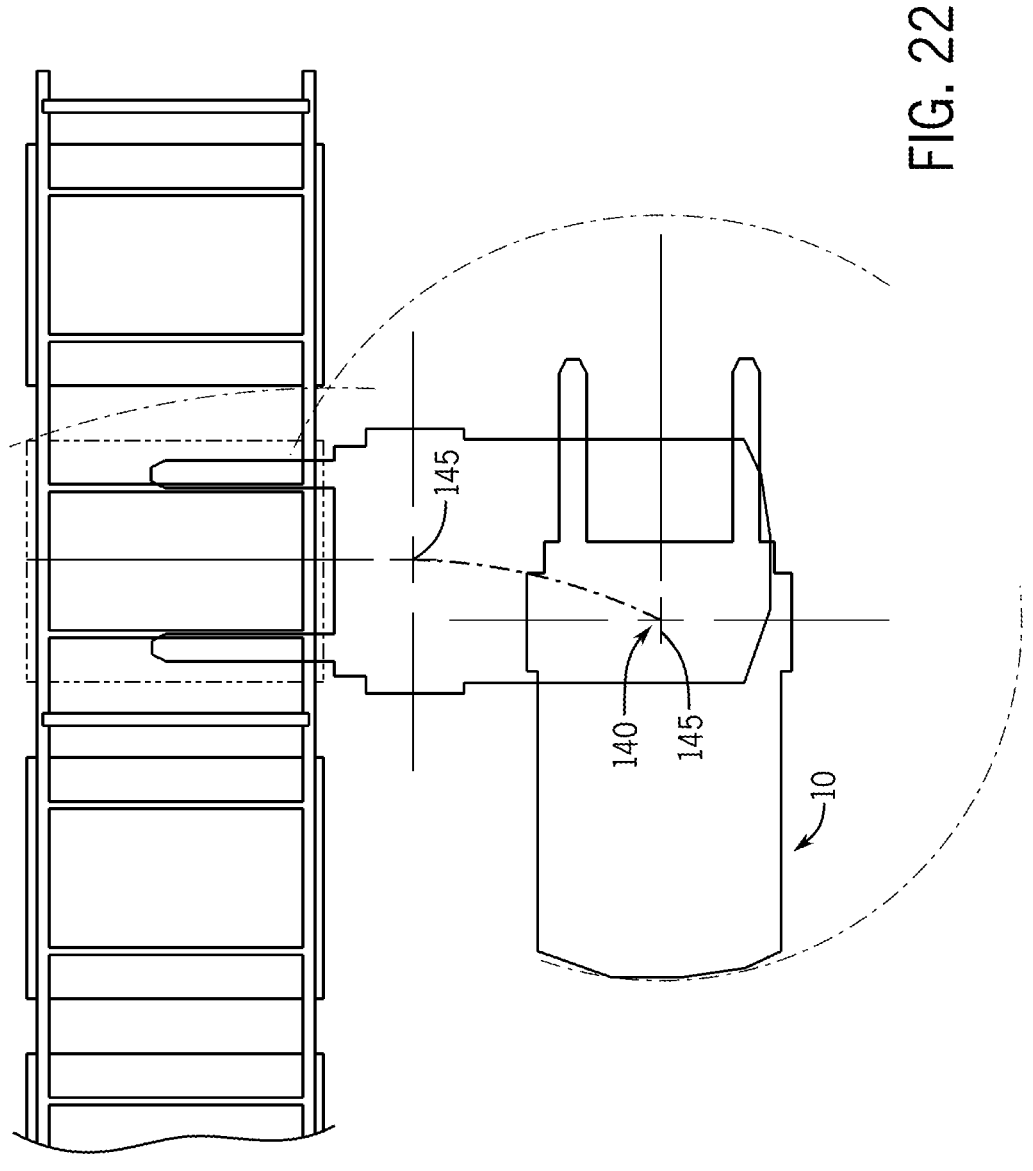
FIG. 22 is an illustrated example of yet another movement pattern that an MHV may take to approach a pallet on a storage rack, according to some aspects of the present disclosure.

Referring to FIGS. 20-22, various example paths an MHV 10 could take to right angle stack a pallet 36 are illustrated. Each path (illustrated using dashed lines) may be chosen before the task is assigned, during operation of the task, and/or based on efficiency data from previous tasks. In addition, the path to be displayed as an overlaid image 140 may be determined by the operator 30, a remote operator of the driver assistance system 41, and/or automatically by the system. In addition, the path can be determined by the geometry and type of MHV 10.

In the example illustrated in FIG. 20, a maneuver of the MHV 10 can be performed through two actions, which may be accomplished autonomously, semi-autonomously, and/or by the operator 30. In any fashion, the operator 30 can remain in control of the MHV 10 during performance of any actions. An automated steering algorithm can interface with a drop location or pallet 148 located a set distance in front of, and to the side of the MHV 10, rotated 90 degrees. In this example, the onboard or off-board vehicle control system can characterize the dimensional position of the load and has the intelligence to perform the path planning tailored to the position of that load relative to the vehicle. In some instances, when starting from a known reference point, as designated by the overlaid image 140, the automated steering algorithm can maneuver the MHV 10 in an arc to position the center of its load wheel axis (pivot point) a distance equal to the radius defined by the distance from the pivot point to the corner of a defined standard load plus margin (i.e., the outer radius). From this point, the MHV 10 can turn to its maximum steer angle and pivot about this pivot point until it is facing 90 degrees from its original orientation. At this point, the automated steering algorithm can straighten out the steering wheel so the operator 30 is aligned to drive straight toward the rack.

FIG. 21 shows an alternate path that may be utilized to approach the pallet or drop location 148 with reduced aisle width requirements. In this example, the path can be composed of a single arc whose radius is equal to the distance from the pivot point to the outside of the base leg. This path may have a reduced aisle width requirement when compared to the path illustrated in FIG. 20.

Depending on the MHV 10 being operated in conjunction with the training reinforcement assistance device 38, various paths may be calculated. For instances, the geometry of a standup counterbalanced vehicle may utilize a slightly different path from those illustrated in FIGS. 20 and 21. As illustrated in FIG. 22, the alternate path can be composed of a pivoting turn followed by arced path, which centers the MHV 10 with respect to the target location. As provided herein, through various components of the training reinforcement assistance device 38 and/or the MHV 10, the driver assistance system 41 provided herein may update a path, or any other overlaid image 140, based on the MHV 10 in operation or any other preference to provide additional information to the operator 30 of the MHV 10.

For certain types of vehicles there are training requirements imposed by various government agencies, laws, rules and regulations. For example, the United States Department of Labor Occupational Safety and Health Administration (OSHA) imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A system comprising:
   a training reinforcement assistance device having a frame supporting an optical system, wherein the optical system is configured to display virtual content on a see-through display, and to enable viewing of at least a portion of a surrounding environment through the see-through display, wherein the frame is configured to be supported on a head of an operator;
   an imager operably coupled with the frame and configured to produce an image of an environment of the imager;
   an accelerometer operably coupled with the frame and configured to detect an orientation of the frame;

an eye-tracking unit operably coupled with the frame and configured to detect a viewing direction of an operator;

a controller operably coupled with the imager and the see-through display; and a device transceiver operably coupled with the controller, the device transceiver configured to communicate with a material handling vehicle transceiver when paired with one another, the material handling vehicle transceiver further coupled to a control unit of the material handling vehicle, wherein the device transceiver receives a vehicle kinematic from the material handling vehicle transceiver, wherein the controller is configured to receive environmental information from at least one of the imager, the accelerometer, or the eye-tracking unit, and to overlay the image onto the at least a portion of the surrounding environment to assist the operator in maneuvering a material handling vehicle based on the orientation of the frame and the vehicle kinematic of the material handling vehicle within a line of sight of the operator through the see-through display, and wherein the material handling vehicle includes at least one fork and the image is positioned on the at least one fork as perceived through the see-through display.

2. The system of claim 1, wherein the image includes one or more reference marks specific to the material handling vehicle's geometry and configured to assist the operator in positioning the material handling vehicle in a predefined location.

3. The system of claim 2, wherein the one or more reference marks include a pivot point defined by the material handling vehicle.

4. The system of claim 3, wherein the pivot point is defined at a point around which the material handling vehicle pivots when a steering angle is set to a maximum steering angle.

5. The system of claim 2, wherein the one or more reference marks include an inner radius that corresponds with a radius swept by outermost points of at least one fork on the material handling vehicle as the material handling vehicle pivots along a maximum steering angle.

6. The system of claim 2, wherein the one or more reference marks include an outer radius that corresponds with a radius swept by outermost points of a load position on at least one fork of the material handling vehicle as the material handling vehicle pivots along a maximum steering angle.

7. The system of claim 1, wherein the vehicle kinematics include at least one of a height of at least one fork relative to a base of the material handling vehicle, a tilt of the at least one fork relative to the base, a side shift position of the at least one fork relative to the base, a reach of the at least one fork relative to the base, a steering angle of the material handling vehicle, a wheelbase of the material handling vehicle, or an overall width of the material handling vehicle.

8. The system of claim 1, wherein the imager is configured to detect one or more fiducials to orient and locate the frame of the training reinforcement assistance device relative to the material handling vehicle.

9. The system of claim 8, wherein the fiducials are mounted on a vehicle body of the material handling vehicle on surfaces visible from an operator compartment.

10. The system of claim 1, wherein the image includes a path projection of the material handling vehicle based on a current steering angle and speed of the material handling vehicle.

11. A system for providing an overlaid image to an operator of a material handling vehicle through an optical system, the system comprising:

a training reinforcement assistance device having a frame supporting an imager and a display, the display operably coupled with the optical system, wherein the frame is configured to be supported on a head of an operator;

a controller coupled with the frame;

a control unit operably coupled with the material handling vehicle and communicatively coupled with the controller, wherein the control unit communicates at least one vehicle kinematic of the material handling vehicle to the controller;

a locating system including at least one of an accelerometer and a gyroscope, the locating system communicatively coupled with the controller and configured to provide orientation information of the frame from the at least one of an accelerometer and a gyroscope to the controller; and a first fiducial positioned on the material handling vehicle, the imager configured to detect the first fiducial to orient the frame relative to the material handling vehicle, wherein the controller is configured to determine a location of the frame based on the detected first fiducial and the orientation information, wherein the display is configured to generate an image based on the location of the frame and the at least one vehicle kinematic.

12. The system of claim 11, wherein the image includes a path projection of the material handling vehicle based on a current steering angle and speed of the material handling vehicle.

13. The system of claim 11, further comprising a second fiducial positioned on the material handling vehicle, wherein the first fiducial is within a field of view of the imager when the operator is oriented in a first direction and the second fiducial is within the field of view when the operator is oriented in a second, opposing direction.

14. The system of claim 11, wherein the image includes one or more reference marks specific to the material handling vehicle's geometry.

15. The system of claim 14, wherein the one or more reference marks include a pivot point defined at a point around which the material handling vehicle pivots when a steering angle is set to a maximum steering angle.

16. The system of claim 14, wherein the one or more reference marks include an inner radius and an outer radius, the inner radius corresponding with a radius swept by outermost points of at least one fork on the material handling vehicle as the material handling vehicle pivots along a maximum steering angle, and the outer radius corresponding with a radius swept by outermost points of a load position on at least one fork of the material handling vehicle as the material handling vehicle pivots along a maximum steering angle.

17. A system comprising:

a material handling vehicle;

a control unit operably coupled with the material handling vehicle;

a training reinforcement assistance device having a frame supporting an optical system, wherein the optical system is configured to display virtual content and enable viewing of at least a portion of a surrounding environment, wherein the frame is configured to be supported on a head of an operator;

an accelerometer operably coupled with the frame and configured to detect an orientation of the frame;

an imager operably coupled with the frame and configured to produce an overlaid image on at least the portion of the surrounding environment; and a controller operably coupled with the imager and the optical system;

a fiducial marker positioned on the material handling vehicle, the imager configured to detect the fiducial marker to orient the frame relative to the material handling vehicle and determine a location of the frame;

wherein the control unit operatively coupled with the material handling vehicle is communicatively coupled with the controller operatively coupled with the optical system and wherein the control unit communicates at least one vehicle kinematic of the material handling vehicle to the controller; and wherein the controller is configured to calculate a position of the overlaid image based on the orientation of the frame and the vehicle kinematic of the material handling vehicle, and wherein the overlaid image includes a pivot point defined by the material handling vehicle.

18. The system of claim 17, wherein the overlaid image includes one or more reference marks including an inner radius and an outer radius, the inner radius corresponding with a radius swept by outermost points of at least one fork on the material handling vehicle as the material handling vehicle pivots along a maximum steering angle, and the outer radius corresponding with a radius swept by outermost points of a load position on at least one fork of the material handling vehicle as the material handling vehicle pivots along a maximum steering angle.

* * * * *